US009942719B2

(12) United States Patent
Bitra et al.

(10) Patent No.: US 9,942,719 B2
(45) Date of Patent: Apr. 10, 2018

(54) OTDOA POSITIONING VIA LOCAL WIRELESS TRANSMITTERS

(71) Applicant: QUALCOMM Incorporated, San Diego, CA (US)

(72) Inventors: Suresh Kumar Bitra, Mangalagiri (IN); Sreekanth Hosahudya Venkataramanappa, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/248,394

(22) Filed: Aug. 26, 2016

(65) Prior Publication Data

US 2018/0063680 A1 Mar. 1, 2018

(51) Int. Cl.
| | |
|---|---|
| H04W 24/00 | (2009.01) |
| H04W 4/02 | (2018.01) |
| H04L 5/00 | (2006.01) |
| H04W 48/12 | (2009.01) |
| G01S 5/02 | (2010.01) |
| G01S 5/06 | (2006.01) |
| H04W 12/06 | (2009.01) |
| H04B 17/318 | (2015.01) |

(52) U.S. Cl.
CPC ........... *H04W 4/028* (2013.01); *G01S 5/0236* (2013.01); *G01S 5/0252* (2013.01); *G01S 5/06* (2013.01); *H04L 5/0048* (2013.01); *H04W 48/12* (2013.01); *H04B 17/318* (2015.01); *H04W 12/06* (2013.01)

(58) Field of Classification Search
CPC ..... H04W 4/028; H04W 48/12; H04W 12/06; G01S 5/0236; G01S 5/0252; G01S 5/06; H04L 5/0048; H04B 17/318

USPC .......................... 455/456.1, 404.2, 509, 450
See application file for complete search history.

(56) References Cited

U.S. PATENT DOCUMENTS

| | | | | |
|---|---|---|---|---|
| 7,307,665 | B2* | 12/2007 | Opshaug | G01S 5/0221 342/463 |
| 8,180,368 | B2* | 5/2012 | Anderson | H04W 64/003 455/404.2 |
| 8,639,270 | B2* | 1/2014 | Moshfeghi | H04W 4/025 370/330 |
| 8,774,836 | B2* | 7/2014 | Abraham | G01S 5/0236 370/328 |
| 8,787,184 | B2* | 7/2014 | Karaoguz | G01S 5/0284 370/252 |

(Continued)

FOREIGN PATENT DOCUMENTS

| | | |
|---|---|---|
| WO | WO-2013022397 A1 | 2/2013 |
| WO | WO-2015151133 A1 | 10/2015 |
| WO | WO-2016024127 A1 | 2/2016 |

OTHER PUBLICATIONS

International Search Report and Written Opinion—PCT/US2017/045812—ISA/EPO—dated Nov. 14, 2017.

*Primary Examiner* — Marceau Milord
(74) *Attorney, Agent, or Firm* — Berkeley Law & Technology Group, LLP

(57) ABSTRACT

Example methods, apparatuses, and/or articles of manufacture are disclosed herein that may be utilized, in whole or in part, to facilitate and/or support one or more operations and/or techniques for improving OTDOA positioning via one or more local wireless transmitters, such as for use in or with mobile communication devices, for example.

30 Claims, 6 Drawing Sheets

(56) References Cited

U.S. PATENT DOCUMENTS

| | | | | |
|---|---|---|---|---|
| 8,787,944 B2* | 7/2014 | Smith | .................. | H04W 64/00 455/404.2 |
| 8,805,401 B2* | 8/2014 | Kosolobov | ........... | G01S 5/0263 370/338 |
| 8,971,920 B2* | 3/2015 | Jiang | ....................... | H04L 1/188 370/310.1 |
| 9,014,727 B2* | 4/2015 | Seshadri | ........... | G06F 17/30578 370/328 |
| 9,188,660 B2* | 11/2015 | Siomina | ................ | G01S 5/0236 |
| 9,237,417 B2* | 1/2016 | Marshall | ................. | G01S 5/021 |
| 9,288,623 B2* | 3/2016 | Markhovsky | ......... | H04W 4/023 |
| 9,294,952 B2* | 3/2016 | Siomina | ................ | G01S 5/0205 |
| 9,414,188 B2* | 8/2016 | Gao | ........................ | H04W 4/02 |
| 9,432,815 B2* | 8/2016 | Edge | ....................... | H04W 4/04 |
| 9,479,303 B2* | 10/2016 | Chen | .................... | H04B 7/2656 |
| 9,491,680 B2* | 11/2016 | Moeglein | ............ | H04W 52/285 |
| 9,500,738 B2* | 11/2016 | Edge | .......................... | G01S 1/66 |
| 9,507,007 B2* | 11/2016 | Markhovsky | ............. | G01S 3/74 |
| 9,549,386 B2* | 1/2017 | Venkatraman | ........ | H04W 64/00 |
| 9,661,601 B2* | 5/2017 | Fischer | ................. | H04W 64/00 |
| 9,699,607 B2* | 7/2017 | Markhovsky | ......... | H04W 4/023 |
| 9,733,337 B2* | 8/2017 | Edge | ....................... | G01S 5/0289 |
| 2007/0286136 A1 | 12/2007 | Rittle et al. | | |
| 2012/0015667 A1* | 1/2012 | Woo | ...................... | G01S 5/0221 455/456.1 |
| 2012/0129550 A1* | 5/2012 | Hannan | ................. | G01S 5/0036 455/456.1 |
| 2012/0129551 A1* | 5/2012 | Islam | .................... | G01S 5/0205 455/456.1 |
| 2012/0184302 A1* | 7/2012 | Kazmi | .................. | H04W 64/00 455/456.5 |
| 2012/0302254 A1 | 11/2012 | Charbit et al. | | |
| 2013/0250851 A1 | 9/2013 | Lakhzouri et al. | | |
| 2013/0321210 A1 | 12/2013 | Werner et al. | | |
| 2014/0073347 A1* | 3/2014 | Yongjin | ................ | H04W 64/00 455/456.1 |
| 2014/0098691 A1* | 4/2014 | Kazmi | ..................... | G01S 5/12 370/252 |
| 2014/0171097 A1 | 6/2014 | Fischer et al. | | |
| 2014/0235273 A1 | 8/2014 | Ahn et al. | | |
| 2015/0018010 A1* | 1/2015 | Fischer | ................. | H04W 4/023 455/456.2 |
| 2015/0215884 A1* | 7/2015 | Horvat | ................. | G01S 5/0294 370/328 |
| 2016/0037301 A1 | 2/2016 | Davydov et al. | | |
| 2016/0100290 A1* | 4/2016 | Smith | .................... | H04W 4/023 455/456.1 |
| 2017/0026798 A1* | 1/2017 | Prevatt | ................... | H04W 4/023 |
| 2017/0041899 A1* | 2/2017 | Venkatraman | ........ | H04W 64/00 |

\* cited by examiner

OTDOA POSITIONING VIA LOCAL WIRELESS TRANSMITTERS

BACKGROUND

1. Field

The present disclosure relates generally to position or location estimations of mobile communication devices and, more particularly, to improving observed time difference of arrival (OTDOA) positioning via one or more local wireless transmitters for use in or with mobile communication devices.

2. Information

Mobile communication devices, such as, for example, cellular telephones, portable navigation units, laptop computers, personal digital assistants, or the like are becoming more common every day. Certain mobile communication devices, such as, for example, location-aware cellular telephones, smart telephones, or the like may assist users in estimating their geographic locations by providing positioning assistance parameters obtained or gathered from various systems. For example, in an outdoor environment, certain mobile communication devices may obtain an estimate of their geographic location or so-called "position fix" by acquiring wireless signals from a satellite positioning system (SPS), such as the global positioning system (GPS) or other like Global Navigation Satellite Systems (GNSS), cellular base station, etc. via a cellular telephone or other wireless or electronic communications network. Acquired wireless signals may, for example, be processed by or at a mobile communication device, and its location may be estimated using known techniques, such as Advanced Forward Link Trilateration (AFLT), base station identification, cell tower triangulation, or the like.

In an indoor or like environment, such as urban canyons, for example, mobile communication devices may be unable to reliably receive or acquire satellite or like wireless signals to facilitate and/or support one or more position estimation techniques. For example, signals from an SPS or other wireless transmitters may be attenuated or otherwise affected in some manner (e.g., insufficient, weak, fragmentary, etc.), which may at least partially preclude their use for position estimations. At times, a mobile communication device may obtain a position fix by measuring ranges to three or more terrestrial wireless transmitter devices, such as cellular base stations, access points, etc. positioned at known locations. Ranges may be measured, for example, by obtaining a Media Access Control identifier (MAC ID) address from wireless signals received from suitable access points and measuring one or more characteristics of received signals, such as signal strength, round trip delay, or the like.

In some instances, a position fix of a mobile communication device may be obtained in connection with an observed time difference of arrival (OTDOA) technique. In this technique, a mobile communication device may measure timing differences between reference signals received from two or more pairs of cellular base stations, for example, and may obtain a position fix based, at least in part, on known locations and transmission timing for the measured base stations. An OTDOA positioning technique may, for example, be employed, in whole or in part, for purposes of traveling, navigation, direction finding, social media applications, or like services. OTDOA positioning technique may also be employed to assist in localization of a mobile communication device in the event of an emergency call, such as in compliance with Emergency 911 (E911) mandates from the Federal Communication Commission (FCC).

At times, however, OTDOA positioning accuracy may be affected, at least in part, by search parameters that may be provided to a mobile communication device via a positioning assistance data, such as to facilitate and/or support appropriate measurements (e.g., reference signal time differences, etc.), for example. Inaccurate search parameters may, for example, introduce errors into OTDOA measurements, may affect positioning accuracy and/or performance of a mobile communication device, or the like. In addition, in some instances, inaccurate search parameters may prompt a mobile communication device to expand a search window, such as to adhere to OTDOA measurement accuracy requirements, for example, which may result in an increase of cellular data usage, associated costs and/or data charges, longer time-to-first-fix (TTFF), or the like. This may also increase power consumption of mobile communication devices with limited power resources (e.g., battery-operated, etc.), thus, negatively affecting operating lifetime or overall utility of such devices.

BRIEF DESCRIPTION OF THE DRAWINGS

Non-limiting and non-exhaustive aspects are described with reference to the following figures, wherein like reference numerals refer to like parts throughout the various figures unless otherwise specified.

SUMMARY

Figure 1:
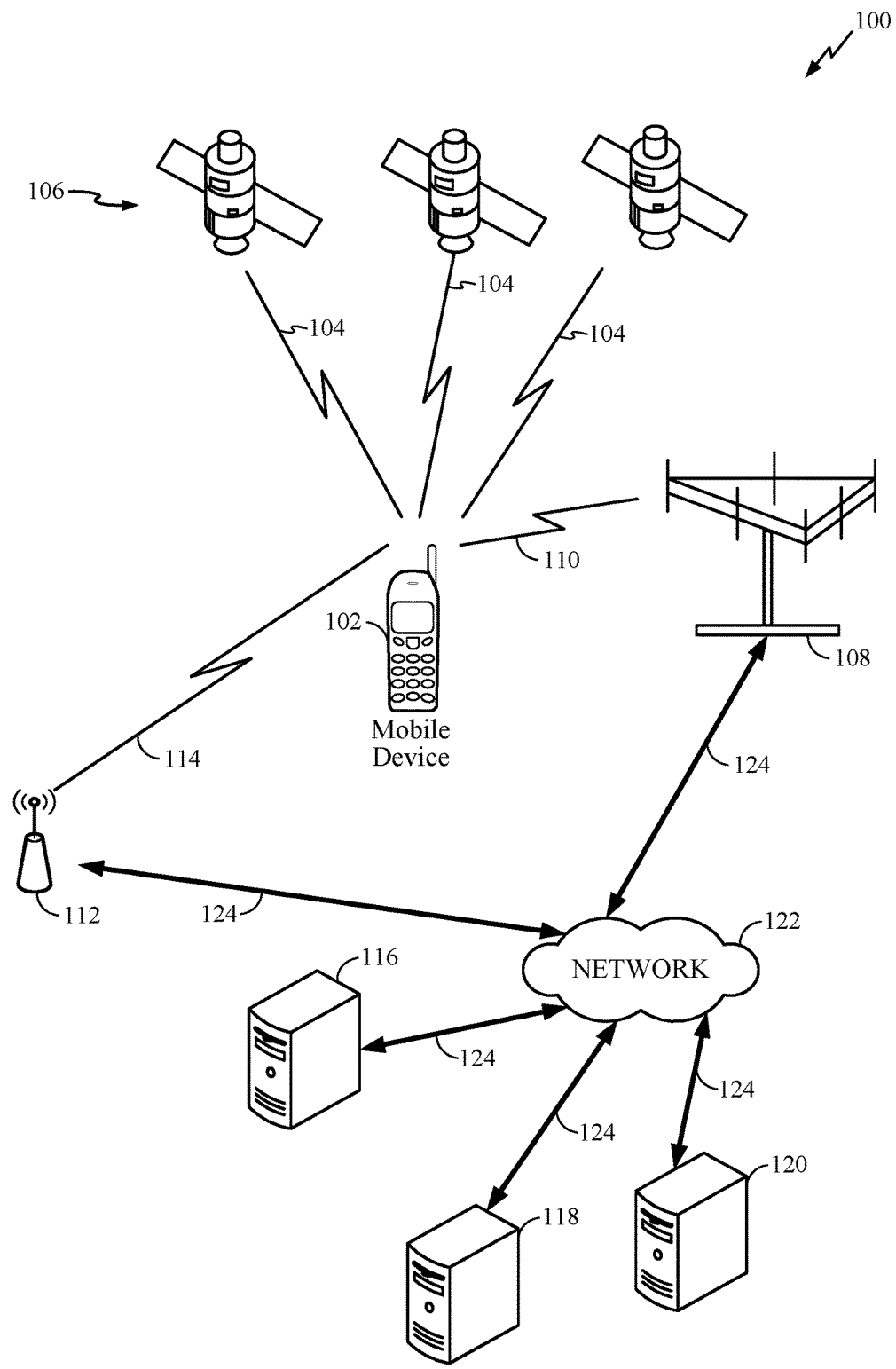
FIG. 1 is a schematic diagram illustrating features associated with an implementation of an example operating environment.

Example implementations relate to techniques for improving OTDOA positioning via one or more local wireless transmitters. In one implementation, a method may comprise acquiring, at a mobile device, one or more signals from one or more local wireless transmitters; transmitting one or more messages to a location server indicating one or more characteristics of the one or more local wireless transmitters obtained via the one or more acquired signals; and receiving one or more messages comprising positioning assistance data for acquisition of one or more positioning reference signals (PRS) from one or more neighbor wireless transmitters based, at least in part, on the one or more characteristics of the acquired one or more signals.

In another implementation, an apparatus may comprise means for acquiring, at a mobile device, one or more signals from one or more local wireless transmitters; means for transmitting one or more messages to a location server indicating one or more characteristics of the one or more local wireless transmitters obtained via the one or more acquired signals; and means for receiving one or more messages comprising positioning assistance data for acquisition of one or more positioning reference signals (PRS) from one or more neighbor wireless transmitters based, at least in part, on the one or more characteristics of the acquired one or more signals.

In yet another implementation, an apparatus may comprise a communication interface to communicate with an electronic communications network, the communication interface configured to acquire one or more signals from one or more local wireless transmitters; and one or more processors coupled to a memory and to the communication interface, the one or more processors configured to initiate a transmission of one or more messages to a location server indicating one or more characteristics of the one or more local wireless transmitters obtained via the one or more acquired signals; and process a receipt one or more messages comprising positioning assistance data for acquisition of one or more positioning reference signals (PRS) from one or more neighbor wireless transmitters based, at least in part, on the one or more characteristics of the acquired one or more signals.

In yet another implementation, an article may comprise a non-transitory storage medium having instructions executable by a processor to acquire one or more signals from one or more local wireless transmitters; initiate a transmission of one or more messages to a location server indicating one or more characteristics of the one or more local wireless transmitters obtained via the one or more acquired signals; and process a receipt one or more messages comprising positioning assistance data for acquisition of one or more positioning reference signals (PRS) from one or more neighbor wireless transmitters based, at least in part, on the one or more characteristics of the acquired one or more signals.

In yet another one implementation, a method may comprise communicating wirelessly with a server to determine at least a location of a local wireless transmitter; and transmitting a beacon signal to a mobile device, the beacon signal comprising one or more parameters indicative of one or more positioning reference signals (PRS) detectable in an area within a range of the beacon signal. It should be understood, however, that these are merely example implementations, and that claimed subject matter is not limited to these particular implementations.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, or articles of manufacture are disclosed herein that may be implemented, in whole or in part, to facilitate and/or support one or more operations and/or techniques for improving OTDOA positioning via one or more local wireless transmitters. Depending on an implementation, local wireless transmitters may include, for example, wireless local area network (WLAN) access points that operate in accordance with the Institute of Electrical and Electronics Engineers (IEEE) standard 802.11 (IEEE 802.11 std. Wi-Fi access points), Bluetooth® beacons that operate in accordance with the IEEE std. 802.15 (WPAN, e.g., Bluetooth® network, etc.), or any other suitable wireless transmitter capable of communicating wirelessly within a local or limited area, or any combination thereof. For example, at times, local wireless transmitters may include radio beacons, femtocells, picocells, Bluetooth® low energy, or the like, or any combination thereof. It should also be noted that even though the discussion throughout the specification primarily references particular signals, protocols, and/or networks, such as, for example, PRS for OTDOA in 4G Long Term Evolution (LTE), such as for ease of description, any other suitable sign signals, protocols, and/or networks, such as 1× signals for Advanced Forward Link Trilateration (AFLT) in Code Division Multiple Access (CDMA), enhanced Cell ID (E-CID), and/or Wi-Fi positioning (e.g., based on downlink signals according to IEEE 802.11x standards, etc.), positioning for short range nodes (SRNs), such as Bluetooth® Low Energy (BTLE) beacons, satellite positioning system (SPS) signals, or the like may also be utilized herein, in whole or in part, such as in a similar or like fashion and/or without deviating from the scope of claimed subject matter.

As used herein, "mobile device," "mobile communication device," "location-aware mobile device," or like terms may be used interchangeably and may refer to any kind of special purpose computing platform or apparatus that may from time to time have a position or location that changes. In some instances, a mobile communication device may, for example, be capable of communicating with other devices, mobile or otherwise, through wireless transmission or receipt of information according to one or more communication protocols. As a way of illustration, special purpose mobile communication devices, which may herein be called simply mobile devices, may include, for example, cellular telephones, smart telephones, personal digital assistants (PDAs), laptop computers, personal entertainment systems, tablet personal computers (PC), personal audio or video devices, personal navigation devices, radio heat map generation tools, or the like. It should be appreciated, however, that these are merely examples of mobile devices that may be used, at least in part, to implement one or more operations and/or techniques for improving OTDOA positioning via one or more local wireless transmitters, and that claimed subject matter is not limited in this regard. It should also be noted that the terms "position" and "location" may be used interchangeably herein.

As alluded to previously, at times, a position fix of a mobile device, such as a cellular telephone, for example, may be obtained based, at least in part, on information gathered from various systems. One such system may comprise, for example, an OTDOA positioning system. In this system, a server may facilitate and/or support positioning of a mobile device by providing positioning assistance data as well as computing and/or verifying (e.g., if computed at a mobile device, etc.) a position fix using one or more specific signals, referred to as reference signals. Namely, a mobile device may, for example, measure a time difference between reference signals received from a reference wireless transmitter and one or more neighbor wireless transmitters positioned at known locations. In this context, a "wireless transmitter" refers to any suitable device capable of transmitting and/or receiving wireless signals, such as via an integrated or associated receiver and/or transmitter, for example. As a way of illustration, a wireless transmitter may comprise, for example, a cellular base station, local wireless transmitter (e.g., WLAN access point, etc.), Bluetooth® beacon, radio beacon, femtocell, picocell, or the like. A mobile device may then compute its position fix, such as using obtained measurements or, optionally or alternatively, may report these measurements to a suitable location server, such as, for example, an Enhanced Serving Mobile Location Center (E-SMLC), a Secure User Plane Location (SUPL) Location Platform (SLP), or the like. In turn, with knowledge of locations of measured wireless transmitters, an E-SMLC, SUPL, or like server may, for example, compute a position fix of a mobile device using measured time differences and relative transmission timing, such as via one or more appropriate multilateration techniques, and may communicate the computed position fix to a mobile device of interest.

As was also indicated, at times, one or more operations and/or techniques for improving OTDOA positioning via one or more local wireless transmitters may also be implemented in connection with one or more other positioning approaches, such as those utilizing measurements of time differences of signals received from a number of wireless transmitters, for example. Thus, in some instances, one or more operations and/or techniques discussed herein may be utilized, at least in part, in connection with, for example, AFLT used for locating a mobile device on a CDMA2000 network, as defined by the 3rd Generation Partnership Project 2 (3GPP2). Similarly to OTDOA, AFLT positioning may, for example, make use of information for measured wireless transmitters to help a mobile device to acquire and/or measure applicable reference signals for purposes of computing a position fix based, at least in part, on these measurements. Depending on an implementation, information may include, for example, locations (e.g., coordinates, etc.), transmission characteristics (e.g., timing, power, signal content, signal characteristics, etc.) of measured wireless transmitters, such as referred to as an almanac, a base station almanac (BSA), almanac data or BSA data, etc. Thus, at times, observed time differences measured by a mobile device (e.g., in connection with OTDOA, AFLT, etc.) may, for example, be used, at least in part, in conjunction with a BSA for measured wireless transmitters to calculate a position fix of a mobile device, such as at or by a location server (e.g., an E-SMLC, SLP, etc.), mobile device, or any combination thereof.

Continuing with the above discussion, to facilitate and/or support one or more operations and/or techniques for improving OTDOA positioning via one or more local wireless transmitters, one or more wireless transmitters on a network may broadcast a PRS that may be distinct from one or more PRS broadcasted by other nearby wireless transmitters due, at least in part, to a use of a different frequency, different encoding, different times of transmission, or the like. A mobile device may measure PRS transmitted by a reference wireless transmitter and a nearby wireless transmitter and may obtain, for example, a time of arrival (TOA) and/or a reference signal time difference (RSTD) measurement. In this context, "RSTD" refers to one or more measurements indicative of a difference in time of arrival between a PRS transmitted by a measured LTE wireless transmitter, referred to herein as a "neighbor wireless transmitter," and a PRS transmitted by a reference wireless transmitter. A reference wireless transmitter may be selected by a location server (e.g., an E-SMLC, SLP, etc.), mobile device, or a combination thereof so as to provide good or otherwise sufficient signal strength observed at a receiver of the mobile device, such that a PRS can be more accurately and/or more quickly acquired and/or measured, such as without any special assistance from a serving network, for example.

At times, such as during an LTE Positioning Protocol (LPP) session, for example, a mobile device may be provided with positioning assistance data by a serving network (e.g., by a location server, etc.) to assist in a PRS acquisition and/or measurement, as was also indicated. For example, at times, a location server may provide to a mobile device of interest OTDOA assistance data listing one or more neighbor wireless transmitters capable of transmitting a PRS, which may include identities, center frequencies, etc. of wireless transmitters, one or more predicted RSTD values, such as expected RSTD and/or expected RSTD uncertainty values, or the like. Assistance data may also include, for example, an identity of a reference wireless transmitter, frequency for a reference PRS signal, reference PRS code sequence, reference PRS transmission times, or the like. In some instances, assistance data may also specify one or more Quality of Service (QoS) parameters, which may also be used, at least in part, in connection with searching a PRS and/or measuring RSTD. For example, in some instances, a QoS parameter may comprise a maximum response time for measuring TOA and/or providing RSTD measurements to a location server and which a mobile device and/or server may take into account, such as while implementing one or more OTDOA positioning operations.

A mobile device may then typically measure a PRS (e.g., a TOA for a PRS, etc.) for one or more neighbor wireless transmitters, such as by integrating a received signal at a neighbor wireless transmitter carrier frequency, for example, in accordance with provided assistance data (e.g., a PRS frequency, etc.) and a QoS parameter (e.g., a maximum response time, etc.). For example, based, at least in part, on received assistance data and/or a QoS parameter, a mobile device may be capable of determining a number of neighbor wireless transmitters to be searched (e.g., for acquisition of a PRS, etc.) in an effective and/or efficient manner, an order and/or duration of a particular PRS search, dynamic time frame for responding with RSTD measurements, or the like. Having measured PRS, a mobile device may perform RSTD measurements, such as utilizing provided assistance data, for example, and may report RSTD measurements to a location server, such as prior to expiration of a maximum response time specified by the server via a QoS parameter.

Currently, a typical approach for searching a PRS, such as via a positioning session using an LPP, as one example, may suffer or otherwise be affected due, at least in part, to one or more inaccurate PRS search parameters related to an RSTD search window. These PRS search parameters may comprise or be represented via, for example, one or more predicted RSTD values, such as expected RSTD values and expected RSTD uncertainty values. In this context, "RSTD search window" or simply "search window" refers to an estimated range defined via one or more RSTD values that a mobile device is expected to measure (e.g., expected RSTD values) from in-range neighbor wireless transmitters, with the limits of the range specified via one or more expected RSTD uncertainty values. An expected RSTD value refers to a PRS search parameter that relates to a quality of a search window and is typically used to specify a search window center. An expected RSTD uncertainty value refers to another PRS search parameter that relates to a size of a search window and is typically used to specify a distance from a reference wireless transmitter to a measuring mobile device. Expected RSTD and expected RSTD uncertainty values may, for example, be provided to a mobile device by a location server via OTDOA assistance data to facilitate and/or support (e.g., to speed up, etc.) searching for and/or acquisition of PRS, such as for the purposes of performing RSTD measurements, as discussed below. Thus, at times, more precise expected RSTD and/or RSTD uncertainty values may, for example, result in a smaller and/or more accurate search window with reduced uncertainty. In turn, a smaller and/or more accurate search window with reduced uncertainty may, for example, improve OTDOA positioning accuracy, such as via improved timing of PRS acquisitions, accuracy of RSTD measurements, or the like. RSTD search windows and PRS search parameters are generally known and need not be described here in greater detail.

In some instances, such as to compute expected RSTD and/or RSTD uncertainty values according to current 3GPP standards, for example, a location server may need to rely on a mobile device in providing its roughly estimated location, such as via a capability transfer message, discussed below. Typically, a rough or so-called "a priori" location of a mobile device may, for example, be determined based, at least in part, on a location of a serving wireless transmitter (e.g., a serving cellular base station, etc.), such as via Cell ID and/or enhanced Cell ID positioning, just to illustrate a few possible examples. Thus, based, at least in part, on a serving wireless transmitter, a location server may, for example, compute and provide to a mobile device OTDOA assistance data comprising expected RSTD and/or RSTD uncertainty values. A mobile device may then use, in whole or in part, expected RSTD and/or RSTD uncertainty values to narrow its search for PRS, such as within an RSTD search window defined by the values, for example. Again, particular examples of OTDOA positioning via a message exchange procedure will be discussed in greater detail below.

Unfortunately, in some instances, these or like approaches may depend, at least in part, on a maximum cellular of like coverage, meaning that, at times, a search window uncertainty may, for example, be proportional to a size of a particular cell or like area of a wireless coverage, which may be relatively large (e.g., up to 100.0 km in 3GPP). At times, this may also introduce errors with respect to a rough or "a priori" location determination, which may prevent or affect estimating a distance from a mobile device to a serving wireless transmitter, for example. As such, in some instances, expected RSTD and/or RSTD uncertainty values, such as computed based, at least in part, on a rough or "a priori" location of a mobile device, for example, may be inaccurate. In turn, inaccurate expected RSTD and/or RSTD uncertainty values may, for example, negatively affect RSTD measurements and/or OTDOA positioning accuracy, may lead to longer TTFF, or the like, as was indicated. In addition, at times, inaccurate PRS search parameters may prompt a mobile device to expand a search window, such as to adhere to 3GPP OTDOA measurement accuracy requirements, for example, which may make PRS searches inefficient, more time-consuming, waste network bandwidth, etc., which may affect power consumption of a mobile device, or the like. Accordingly, it may be desirable to develop one or more methods, systems, and/or apparatuses that may enhance and/or improve a typical 3GPP approach for PRS searching, such as via more accurate PRS search parameters dependent on more accurate "a priori" estimation of a mobile device's location, for example.

Thus, as will be discussed in greater detail below, in an implementation, to more accurately determine its rough or "a priori" location, a mobile device (e.g., on an LTE network, etc.) may, for example, make use of one or more local wireless transmitters (e.g., WLAN access points, etc.) associated with and/or deployed by a cellular or like wireless service provider. In some instances, a cellular or like wireless service provider may, for example, deploy local wireless transmitters, such as in addition to cellular or like wireless transmitters (e.g., base station transceivers, etc.), to at least partially offload wireless traffic from a cellular network (e.g., an LTE network, etc.) to a WLAN or like network (e.g., a Wi-Fi network, etc.). Since these local wireless transmitters are typically associated with and/or maintained by a cellular or like wireless service provider, their deployed locations are typically fixed and/or known. As will be seen, at times, locations of these local wireless transmitters may, for example, be used, at least in part, for more accurate "a priori" estimation of a mobile device's location.

For example, in an implementation, a mobile device may perform a scan, such as a passive and/or active scan of an area of interest, such as to detect one or more proximate or in-range local wireless transmitters and/or obtain one or more associated characteristics. As a way of illustration, an active scan may, for example, be performed via transmitting one or more requests, such as in the form of one or more unicast packets and receiving one or more responses from one or more proximate wireless transmitters, and a passive scan may, for example, be performed by "listening" for or discovering wireless signals broadcasted by proximate wireless transmitters. Passive and active scans are generally known and need not be described here in greater detail. Typically, characteristics of wireless transmitters, local or otherwise, may include, for example, identifiers of wireless transmitters, such as cellular identifications (Cell IDs), basic service set identifications (BSS IDs), service set identifications (SS IDs), etc., characteristics of associated wireless signals (e.g., received signal strength, round trip time, time of arrival, angle of arrival, transmission power levels, etc.), or the like.

In some instances, having obtained one or more characteristics of proximate local wireless transmitters, a mobile device may, for example, subsequently include these characteristics in a suitable message to a location server. Since, typically, wireless coverage of local wireless transmitters is relatively small, such as limited to a particular local area, for example, in certain simulations or experiments, it has been observed that a particular location of a local wireless transmitter may be used as a proxy for a mobile device's location, such as for purposes of computing more accurate expected RSTD and/or RSTD uncertainty values. Thus, using communicated characteristics (e.g., Cell ID, etc.), at least in part, a location server may determine a particular local wireless transmitter proximate to a mobile device of interest and may use the transmitter's known location as a rough or "a priori" location of the mobile device. As discussed below, in some instances, such as if more than one local wireless transmitter is detected in mobile device's proximity, a location server may, for example, select a location of a more proximate local wireless transmitter as an "a priori" location, such as using one or more appropriate techniques. For example, this discrepancy between two or more proximate local wireless transmitters (e.g., which transmitter is more proximate, etc.) may be resolved in favor of a local wireless transmitter with a higher measured power level, such as stronger signal strength observed at a receiver of a mobile device of interest, just to illustrate one possible implementation. Claimed subject matter is not so limited, of course. Any other suitable approaches may be used herein, in whole or in part, or otherwise considered. For example, at times, a discrepancy between two or more proximate local wireless transmitters may, for example be resolved in connection with a digital map of an indoor or like area of interest. A digital map may, for example, be used, at least in part, to obtain additional context with respect to an area of interest and/or applicable radio environment, such as associated multipath, reflection, diffraction, path loss, etc. due to walls, etc., frame of reference, or the like.

Thus, with knowledge of locations of identified local wireless transmitters, more accurate "a priori" estimation of a mobile device's location may, for example, be made, such as compared to Cell ID or like positioning. In turn, a more accurate estimate of an "a priori" location of a mobile device may, for example, result in more accurate prediction of RSTD values that a mobile device is expected to measure, more accurate expected RSTD uncertainty values, etc., which, in turn, may lead to more accurate OTDOA positioning. As discussed below, here, various approaches may be utilized, in whole or in part, or otherwise considered. For example, in some instances, one or more crowdsourcing operations may be employed, at least in part, to determine and/or refine locations of local wireless transmitters within an area of interest, such as for purposes of "a priori" location determination, as one example. In addition, at times, one or more parameters for searching PRS, such as PRS search parameters and/or PRS transmission-related parameters, for example, may be broadcasted via local wireless transmitters, which may result in a more precise search window and may allow a mobile device to initiate a PRS search prior to receiving OTDOA assistance data, such as improving TTFF. Also, in some instances, one or more Internet-of-Things (IoT) devices installed in a smart home or like environment and having an LTE or like capability in addition to a local or like capability may, for example, be used, at least in part, to improve a PRS search by fine tuning PRS search parameters for a proximate mobile device, as will also be seen.

FIG. 1 is a schematic diagram illustrating features associated with an implementation of an example operating environment 100 capable of facilitating or supporting one or more processes and/or operations for improving OTDOA positioning via one or more local wireless transmitters for use in or with a mobile device, such as a location-aware mobile device 102, for example. It should be appreciated that operating environment 100 is described herein as a non-limiting example that may be implemented, in whole or in part, in the context of various electronic communications networks or combination of such networks, such as public networks (e.g., the Internet, the World Wide Web), private networks (e.g., intranets), WWAN, wireless local area networks (WLAN, etc.), or the like. It should also be noted that claimed subject matter is not limited to indoor implementations. For example, at times, one or more operations or techniques described herein may be performed, at least in part, in an indoor-like environment, which may include partially or substantially enclosed areas, such as urban canyons, town squares, amphitheaters, parking garages, rooftop gardens, patios, or the like. At times, one or more operations or techniques described herein may be performed, at least in part, in an outdoor environment.

As illustrated, in an implementation, mobile device 102 may, for example, receive or acquire satellite positioning system (SPS) signals 104 from SPS satellites 106. In some instances, SPS satellites 106 may be from a single global navigation satellite system (GNSS), such as the GPS or Galileo satellite systems, for example. In other instances, SPS satellites 106 may be from multiple GNSS such as, but not limited to, GPS, Galileo, Glonass, or Beidou (Compass) satellite systems. In certain implementations, SPS satellites 106 may be from any one several regional navigation satellite systems (RNSS) such as, for example, WAAS, EGNOS, QZSS, just to name a few examples.

At times, mobile device 102 may, for example, transmit wireless signals to, or receive wireless signals from, a suitable wireless communication network. In one example, mobile device 102 may communicate with a cellular communication network, such as by transmitting wireless signals to, or receiving wireless signals from, one or more wireless transmitters capable of transmitting and/or receiving wireless signals, such as a base station transceiver 108 over a wireless communication link 110, for example. Similarly, mobile device 102 may transmit wireless signals to, or receive wireless signals from a local transceiver 112 over a wireless communication link 114. Base station transceiver 108, local transceiver 112, etc. may be of the same or similar type, for example, or may represent different types of devices, such as access points, radio beacons, cellular base stations, femtocells, or the like, depending on an implementation. Similarly, local transceiver 112 may comprise, for example, a wireless transmitter and/or receiver capable of transmitting and/or receiving wireless signals. For example, as will be seen, at times, wireless transceiver 112 may be capable of obtaining one or more observations from one or more other terrestrial transmitters.

In a particular implementation, local transceiver 112 may be capable of communicating with mobile device 102 at a shorter range over wireless communication link 114 than at a range established via base station transceiver 108 over wireless communication link 110. For example, local transceiver 112 may be positioned in an indoor or like environment and may provide access to a wireless local area network (WLAN, e.g., IEEE Std. 802.11 network, etc.), wireless personal area network (WPAN, e.g., Bluetooth® network, etc.), or like local area networks. For example, in another example implementation, local transceiver 112 may comprise a femtocell or picocell capable of facilitating communication via link 114 according to an applicable cellular or like wireless communication protocol. Of course, it should be understood that these are merely examples of networks that may communicate with mobile device 102 over a wireless link, and claimed subject matter is not limited in this respect. For example, in some instances, operating environment 100 may include a larger number of base station transceivers 108, local transceivers 112, etc.

In an implementation, base station transceiver 108, local transceiver 112, etc. may communicate with servers 116, 118, or 120 over a network 122 via one or more links 124. Network 122 may comprise, for example, any combination of wired or wireless communication links. In a particular implementation, network 122 may comprise, for example, Internet Protocol (IP)-type infrastructure capable of facilitating or supporting communication between mobile device 102 and one or more servers 116, 118, 120, etc. via local transceiver 112, base station transceiver 108, etc. In another implementation, network 122 may comprise, for example cellular communication network infrastructure, such as a base station controller or master switching center to facilitate and/or support mobile cellular communication with mobile device 102. As was indicated, in some instances, network 122 may facilitate and/or support communications with a Public Safety Answering Point (PSAP) (not shown) or like entity, such as for purposes of initiating and/or implementing an E911 OTDOA positioning session, for example. Servers 116, 118, and/or 120 may comprise any suitable servers or combination thereof capable of facilitating or supporting one or more operations or techniques discussed herein. For example, servers 116, 118, and/or 120 may comprise one or more location servers (e.g., Evolved Serving Mobile Location Server (E-SMLC), Secure User Plane Location Server/SUPL Location Platform (SUPL SLP), etc.), positioning assistance servers, navigation servers, map servers, crowdsourcing servers, network-related servers, or the like.

In particular implementations, and as also discussed below, mobile device 102 may have circuitry or processing resources capable of determining a position fix or estimated location of mobile device 102, rough (e.g., "a priori") or otherwise. For example, if satellite signals 104 are available, mobile device 102 may compute a position fix based, at least in part, on pseudorange measurements to four or more SPS satellites 106. Here, mobile device 102 may compute such pseudorange measurements based, at least in part, on pseudonoise code phase detections in signals 104 acquired from four or more SPS satellites 106. In particular implementations, mobile device 102 may receive from one or more servers 116, 118, or 120 positioning assistance data to aid in the acquisition of signals 104 transmitted by SPS satellites 106 including, for example, almanac, ephemeris data, Doppler search windows, just to name a few examples. If satellite signals 104 are not available, mobile device 102 may, for example, compute a position fix based, at least in part, on Cell ID, enhanced Cell ID, or like positioning. As discussed below, in some instances, mobile device 102 may, for example, compute a rough or "a priori" position fix based, at least in part, on one or more characteristics and/or aspects of local transceiver 112 obtained in connection with one or more positioning tiles, among other things.

In some implementations, mobile device 102 may obtain a position fix by processing wireless signals received from one or more terrestrial transmitters positioned at known locations (e.g., base station transceiver 108, local transceiver 112, etc.) using any one of several techniques, such as, for example, OTDOA, AFLT, or the like. In these techniques, a range from mobile device 102 may, for example, be measured to three or more of terrestrial transmitters based, at least in part, on one or more reference signals (e.g., PRS, etc.) transmitted by these transmitters and received at mobile device 102, as was indicated. Here, servers 116, 118, or 120 may be capable of providing positioning assistance data to mobile device 102 including, for example, OTDOA reference transmitter data, OTDOA neighbor transmitter data, PRS configuration data, RSTD search window, QoS parameters, locations, identities, orientations, etc. of terrestrial transmitters to facilitate and/or support one or more applicable positioning techniques (e.g., AFLT, OTDOA, etc.). At times, servers 116, 118, or 120 may include, for example, a base station almanac (BSA) indicating locations, identities, orientations, etc. of cellular base stations (e.g., base station transceiver 108, local transceiver 112, etc.) in one or more particular areas or regions associated with operating environment 100.

As alluded to previously, in particular environments, such as indoor or like environments (e.g., urban canyons, etc.), mobile device 102 may not be capable of acquiring or processing signals 104 from a sufficient number of SPS satellites 106 so as to perform a suitable positioning technique. Thus, optionally or alternatively, mobile device 102 may be capable of determining a position fix based, at least in part, on signals acquired from one or more local transmitters, such as femtocells, Wi-Fi access points, or the like. For example, mobile device 102 may obtain a position fix by measuring ranges to three or more local transceivers 112 positioned at known locations. In some implementations, mobile device 102 may, for example, measure ranges by obtaining a MAC address from local transceiver 112, as was indicated.

In an implementation, mobile device 102 may, for example, receive positioning assistance data (e.g., OTDOA, AFLT assistance data, etc.) for one or more positioning operations from servers 116, 118, and/or 120. At times, positioning assistance data may include, for example, locations, identities, orientations, etc. of one or more local transceivers 112, base station transceivers 108, etc. positioned at known locations for measuring ranges to these transmitters based, at least in part, on an RTT, TOA, TDOA, etc., or any combination thereof. In some instances, positioning assistance data to aid indoor positioning operations may include, for example, radio heat maps, context parameter maps, routeability graphs, positioning tiles, etc., just to name a few examples. Other assistance data received by mobile device 102 may include, for example, electronic digital maps of indoor or like areas for display or to aid in navigation. A map may be provided to mobile device 102 as it enters a particular area, for example, and may show applicable features such as doors, hallways, entry ways, walls, etc., points of interest, such as bathrooms, pay phones, room names, stores, or the like. By obtaining a digital map of an indoor or like area of interest, mobile device 102 may, for example, be capable of overlaying its current location over the displayed map of the area so as to provide an associated user with additional context, frame of reference, or the like. The terms "positioning assistance data" and "navigation assistance data" may be used interchangeably herein.

According to an implementation, mobile device 102 may access navigation assistance data via servers 116, 118, and/or 120 by, for example, requesting such data through selection of a universal resource locator (URL). In particular implementations, servers 116, 118, and/or 120 may be capable of providing navigation assistance data to cover many different areas including, for example, floors of buildings, wings of hospitals, terminals at an airport, portions of a university campus, areas of a large shopping mall, etc., just to name a few examples. Also, if memory or data transmission resources at mobile device 102 make receipt of positioning assistance data for all areas served by servers 116, 118, and/or 120 impractical or infeasible, a request for such data from mobile device 102 may, for example, indicate a rough or course estimate of a location of mobile device 102. Mobile device 102 may then be provided navigation assistance data covering, for example, one or more areas including or proximate to a roughly estimated location of mobile device 102. In some instances, one or more servers 116, 118, and/or 120 may facilitate and/or support searching for and/or measuring PRS from one or more applicable wireless transmitters (e.g., local transceiver 112, base station transceiver 108, etc.) and/or performing RSTD or like measurements, such as for determining a position fix in connection with an E911 OTDOA positioning session, for example, and may provide the position fix to an applicable PSAP via network 122.

Even though a certain number of computing platforms and/or devices are illustrated herein, any number of suitable computing platforms and/or devices may be implemented to facilitate and/or support one or more techniques or processes associated with operating environment 100. For example, at times, network 122 may be coupled to one or more wired or wireless communication networks (e.g., WLAN, etc.) so as to enhance a coverage area for communications with mobile device 102, one or more base station transceivers 108, local transceiver 112, servers 116, 118, 120, or the like. In some instances, network 122 may facilitate and/or support femtocell-based operative regions of coverage, for example. Again, these are merely example implementations, and claimed subject matter is not limited in this regard.

Figure 2:
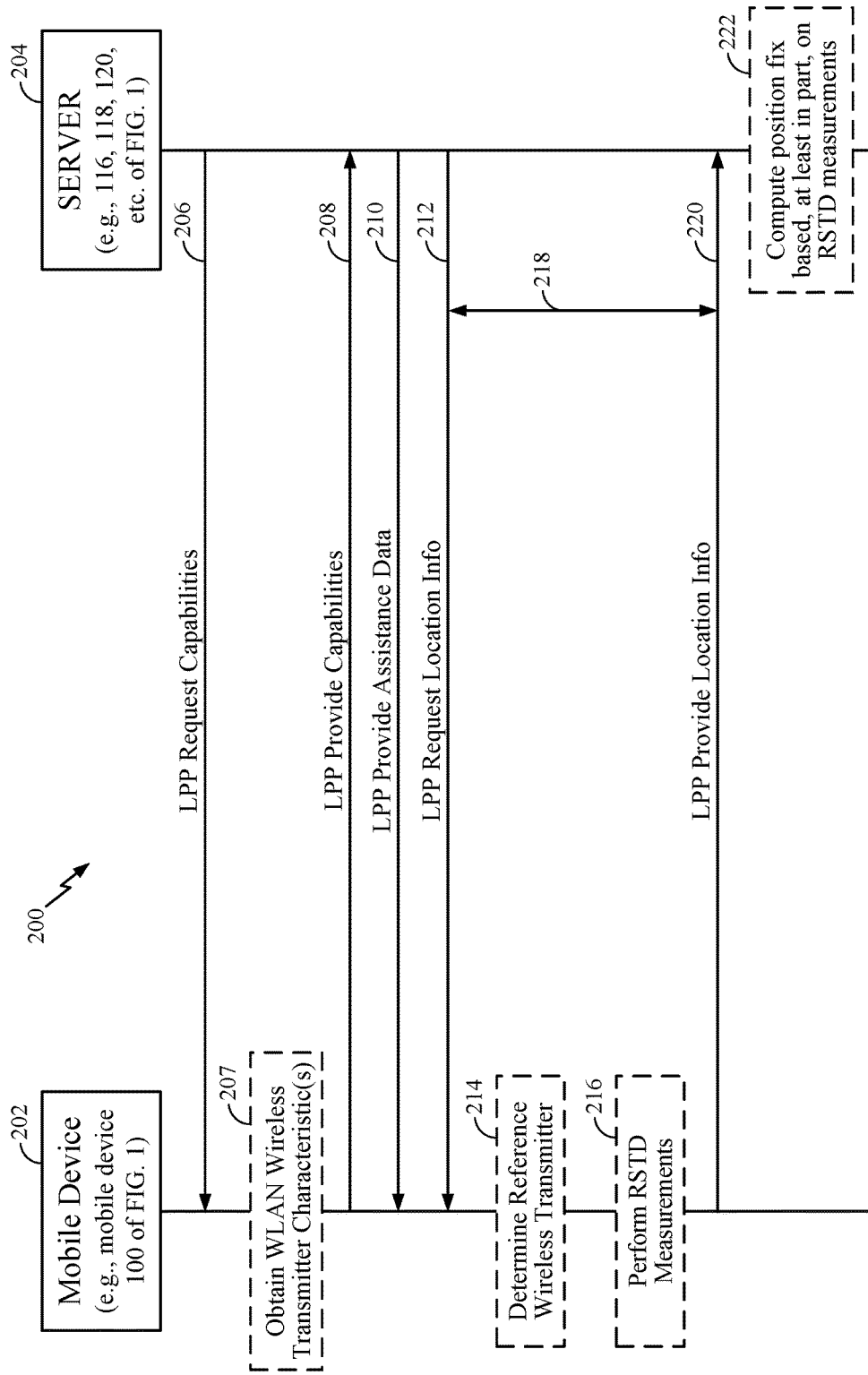
FIG. 2 is a message flow diagram illustrating an implementation of an example message exchange process for improving OTDOA positioning via one or more local wireless transmitters.

Referring now to FIG. 2, which is a message flow diagram illustrating an implementation of an example message exchange process 200 between a mobile device 202 and a server 204 that may facilitate and/or support one or more operations and/or techniques for improving OTDOA positioning via one or more local wireless transmitters. As was indicated, even though process 200 illustrates OTDOA positioning using an LPP, claimed subject matter is not limited in this regard, and any other suitable positioning technique and/or protocol may be used herein, in whole or in part. For example, in some instances, an LPPe, LPP/LPPe, RRC protocol (e.g., as defined in 3GPP TS 36.331, etc.), IS-801 protocol (e.g., as defined in 3GPP2 TS C.S0022, etc.), or the like may also be employed herein, in whole or in part. At times, one or more operations and/or techniques for improving OTDOA positioning via one or more local wireless transmitters may, for example, be implemented via OTDOA positioning for UMTS access, Enhanced Observed Time Difference (E-OTD) for GSM or AFLT, or the like. In addition, a downlink signal that is measured by mobile device 202 may not be a PRS, such as currently defined in 3GPP, but some other downlink reference signal or pilot signal (e.g., a common reference signal for LTE, etc.). Also, measurements of a downlink signal may not be of RSTD, such as also defined by 3GPP, for example, but instead of some other suitable quantity and/or phenomena, such as TOA, angle of arrival (AOA), received signal strength (e.g., RSSI), return trip time (RTT), signal-to-noise (S/N) ratio, or the like. Thus, although one or more applicable positioning techniques, protocols, measured quantities, etc. may differ, a search strategy with respect to acquisition of one or more downlink reference signals and/or pilot signals, such as via one or more runtime conditions, as discussed below, for example, may be the same as or similar to that described for process 200.

At times, process 200 may, for example, be implemented, at least in part, within operating environment 100 of FIG. 1. Thus, in some instances, mobile device 202 may comprise or be representative of mobile device 100 of FIG. 1, for example, and server 204 may comprise or be representative of server 116, 118, and/or 120 of FIG. 1, for example. In some instances, mobile device 202 may comprise, for example, a SUPL Enabled Terminal (SET), and server 204 may comprise, for example, a SUPL Location Platform (SLP), such as an H-SLP or D-SLP, just to illustrate one possible implementation. It should be noted that information acquired and/or produced, such as input signals, output signals, operations, results, messages, etc. associated with process 200 may be represented via one or more digital signals. It should also be appreciated that even though one or more operations are illustrated or described concurrently or with respect to a certain sequence, other sequences or concurrent operations may be employed. In addition, although the description below references particular aspects or features illustrated in certain other figures, one or more operations may be performed with other aspects or features.

As illustrated, positioning of mobile device 202 may be facilitated and/or supported via an exchange of LPP messages between mobile device 202 and server 204 via any suitable communications network, such as network 122 of FIG. 1, for example, via one or more wireless transmitters, such as base station transceiver 108, local transceiver 112 of FIG. 1, etc., or a combination thereof. As will be seen, in some instances, process 200 may be used, at least in part, to eliminate or reduce RSTD measurement errors that may depend, at least in part, on one or more PRS search parameters for a search window, such as expected RSTD and/or RSTD uncertainty values, for example. As will also be seen, in some instances, process 200 may be used, at least in part, to obtain a relatively faster and/or more accurate TTFF of mobile device 202, such as if a search for PRS is initiated prior to receiving or obtaining OTDOA positioning assistance data from server 204, for example. As was indicated, at times, process 200 may, for example, be used, at least in part, to obtain a location estimate of greater accuracy, such as for routing of the location estimate to a PSAP to satisfy E911 services in connection with an emergency call from mobile device 202, for example. Again, it should be noted that process 200 is not limited to indoor implementations. For example, at times, process 200 may be performed, at least in part, in an indoor-like environment, which may include partially or substantially enclosed areas, such as urban canyons, town squares, amphitheaters, parking garages, rooftop gardens, patios, or the like. In some instances, process 200 may, for example, be performed, at least in part, in an outdoor environment.

Thus, as illustrated, server 204 may, for example, transmit an LPP Request Capabilities message 206 to mobile device 202, such as indicating what types of capabilities are needed and/or supported by server 204 for an LPP positioning session. In turn, mobile device 202 may, for example, transmit an LPP Provide Capabilities message 208 providing its positioning capabilities to server 204, such as by specifying modes, frequency bands, etc. that are supported by mobile device 202. As referenced at 207, in some instances, such as prior to transmitting LPP Provide Capabilities message 208, for example, mobile device 202 may obtain one or more characteristics of one or more proximate local wireless transmitters that may be associated with and/or deployed by a cellular or like wireless service provider, such as to offload LTE wireless traffic to Wi-Fi or like network via server 204 (e.g., via Wi-Fi Offload functionality, etc.), as was indicated. Thus, here, since neighbor wireless transmitters and local wireless transmitters may be maintained by the same cellular or like wireless service provider, their locations may be known, such as to server 204, for example. Claimed subject matter is not so limited, of course. For example, in some instances, locations of local wireless transmitters may be determined via a third party, as will be seen. As discussed above, characteristics of local wireless transmitters may include, for example, Cell IDs, BSS IDs, MAC addresses, received signal strengths, round trip times, or the like.

According to an implementation, to obtain one or more characteristics of one or more proximate local wireless transmitters, mobile device 202 may implement a scan, such as a passive and/or active scan of an area of interest, for example. Mobile device 202 may, for example, detect and/or decode particular characteristics encoded in observed wireless signals using one or more appropriate techniques, such as via demodulating an applicable wireless signal, as one possible example. Having obtained one or more characteristics of one or more proximate local wireless transmitters, mobile device 202 may include these characteristics in an appropriate message to server 204, such as, for example, LPP Provide Capabilities message 208, though claimed subject matter is not so limited. For example, at times, mobile device 202 may include one or more characteristics of one or more proximate local wireless transmitters in an LPP Request Assistance Data message (not shown) to server 204, which may be communicated prior to or after LPP Provide Capabilities message 208. Based, at least in part, on transmitted characteristics, server 204 may, for example, be capable of correlating an identity of a particular local wireless transmitter of interest with its location, such as via a mapped Cell ID, and may use such location as a rough or "a priori" location of mobile device 202, as will be seen.

At times, one or more characteristics of one or more proximate local wireless transmitters may, for example, be obtained in connection with one or more so-called "positioning tiles." As used herein, "positioning tile" refers to one or more parameters descriptive of attributes of wireless transmitters grouped with respect to one or more predefined geographically-bounded areas (e.g., 1.0 km by 1.0 km squares, etc.). These attributes may include, for example, locations, transmission power, unique identifiers (e.g., Wi-Fi MAC address, Cell ID, Bluetooth device ID, Near Field Communication (NFC) device ID, etc.), etc. of wireless transmitters, such as located within and/or proximate to a particular geographically-bounded area. One or more positioning tiles may be, for example, be provided to mobile device 202 via any suitable technology, such as by server 204 or any other suitable server and/or entity. By way of example but not limitation, in at least one implementation, Zero Power Positioning (ZPP) technology proprietary to Qualcomm® may, for example, be employed herein, in whole or in part. For example, in some instances, one or more positioning tiles may be provided to mobile device 202 via a third party server, such as via one or more proprietary communication links. By way of another example but not limitation, in at least one implementation, Qualcomm®'s proprietary technology capable of providing one or more positioning tiles may include a global terrestrial positioning (GTP) and/or terrestrial downlink positioning (TDP) protocol and/or approach. Claimed subject matter is not so limited, of course. For example, any other suitable technology capable of facilitating and/or supporting timely access to and/or download of one or more positioning tiles relevant to a current location of mobile device 202, roughly-determined or otherwise, may be utilized, in whole or in part. One or more positioning tiles may be used, at least in part, by mobile device 202 to obtain estimated locations of one or more observed or "visible" local wireless transmitters, such as via corresponding Cell-IDs tagged to respective transmitter locations within the tiles, for example. Mobile device 202, thus, may determine and/or select a particular local wireless transmitter and may communicate with server 204 with respect its rough or "a priori" location.

In an implementation, having received one or more characteristics of one or more proximate local wireless transmitters, server 204 may, for example, determine their respective locations and may compute more accurate expected RSTD and/or expected RSTD uncertainty values. As was indicated, here, server 204 may, for example, consider a location of a particular local wireless transmitter as a rough or "a priori" location of mobile device 202, such as using one or more appropriate techniques. Likewise, locations of local wireless transmitters may, for example, be determined, at least in part, via corresponding Cell-IDs tagged to respective local transmitter locations and/or stored in an appropriate database (e.g., maintained by a cellular or like wireless service provider, etc.). Here, if characteristics of one particular proximate local wireless transmitter are detected and/or transmitted, its location may, for example, be considered as a rough or "a priori" location of mobile device 202. If, however, characteristics of more than one proximate local wireless transmitter are detected and/or transmitted, a location of a local wireless transmitter more proximate to mobile device 202 may, for example, be considered as a rough or "a priori" location of mobile device 202.

A local wireless transmitter more proximate to mobile device 202, such as among a plurality of in-range local wireless transmitters, for example, may be determined via any suitable approach. For example, in some instances, measured power levels, such as via signal strength-related values (e.g. RSSI, etc.) may be used, at least in part, to determine a more proximate local wireless transmitter. Here, a local wireless transmitter with a stronger signal, such as in relation to other in-range local wireless transmitters may, for example, be indicative of a closer geographical relation (e.g., spatial distance, etc.) to mobile device 202 and, thus, may be considered more proximate to mobile device 202. Of course, claimed subject matter is not so limited. Other suitable approaches for determining a more proximate local wireless transmitter, such as a probabilistic approach, k-nearest-neighbor (kNN), neural networks, support vector machine (SVM), via digital map, or the like may be employed, in whole or in part. Thus, using a location of an appropriate local wireless transmitter as a rough location of mobile device 202, more accurate "a priori" location estimate may, for example, be obtained, and more accurate PRS search parameters may be computed.

In some instances, such as if server 204 is unable to associate or correlate received characteristics of one or more proximate local wireless transmitters with their respective locations, which may be due, at least in part, to their ownership by a third party, for example, one or more crowdsourcing operations may be employed herein, in whole or in part. For example, server 204 may make use of an appropriate crowdsourcing server (a GTP server, etc.) to determine locations of scanned local wireless transmitters and/or compute expected RSTD and/or expected RSTD uncertainty values. Here, mobile device 202 may make use of one or more positioning tiles comprising locations of local wireless transmitters, cellular base stations, etc., as discussed above, for example, such as for computing more accurate expected RSTD and/or RSTD uncertainty values. In some instances, utilizing positioning assistance data, mobile device 202 may, for example, compute these or like values for applicable cellular base stations as well, in which expected RSTD and/or RSTD uncertainty values previously received from server 204 may be disregarded. Claimed subject matter is not limited to a particular approach, of course.

According to an implementation, having computed PRS search parameters, such as expected RSTD and/or expected RSTD uncertainty values, for example, server 204 may transmit an LPP Provide Assistance Data message 210 to mobile device 202, such as comprising, for example, OTDOA assistance data for performing and/or returning RSTD measurements to server 204. As discussed above, OTDOA assistance data may indicate that a particular wireless transmitter is to be used by mobile device 202 as a reference wireless transmitter, may provide applicable PRS parameters, expected RSTD and/or expected RSTD uncertainty values, or the like. In some instances, LPP Provide Assistance Data message 210 may also include, for example, measured cell-specific reference signals (CRS) power levels for neighbor wireless transmitters, such as represented via a list or like data structure with corresponding reference signal received power (RSRP) values (e.g., in dBm, etc.). In this context, "RSRP" refers to a linear average over a power contribution of one or more reference signals, such as CRS, for example, observed at a receiver of mobile device 202 within a considered measurement frequency bandwidth. CRS and RSRP are generally known and need not be described here in greater detail. In some instances, RSRP values may, for example, be used, at least in part, by mobile device 202 to prioritize an acquisition of PRS from stronger neighbor wireless transmitters.

Server 204 may then send an LPP Request Location Information message 212 to mobile device 202 to request RSTD measurements for a reference wireless transmitter and up to seventy-two neighbor wireless transmitters, for example. LPP Request Location Information message 212 may also comprise, for example, a desired accuracy of an OTDOA location estimate, expected multipath and/or non-line-of-sight (NLOS) conditions, and/or an optional periodic reporting period. In some instances, LPP Request Location Information message 212 may include, for example, a QoS parameter, such as indicating a timeframe for responding with RSTD measurements. As illustrated at 214, mobile device 202 may, for example, determine and/or make use of any indicated reference wireless transmitter. Mobile device 202 may, for example, base its determination, at least in part, on a signal level and/or signal quality (e.g. a S/N ratio, etc.) of one or more wireless transmitters indicated as being suitable (or not unsuitable) as a reference wireless transmitter. For example, at times, mobile device 202 may, for example, determine to use a wireless transmitter with a higher signal strength and/or higher S/N ratio, just to illustrate one possible implementation. Claimed subject matter is not so limited, of course. For example, in at least one implementation, mobile device 202 may employ a reference wireless transmitter specifically designated as such by server 204.

As illustrated at 216, having determined a reference wireless transmitter, mobile device 202 may, for example, utilize, in whole or in part, obtained OTDOA assistance data to perform one or more RSTD measurements, such as based, at least in part, on more accurate "a priori" estimation of a mobile device's location determined via one or more proximate local wireless transmitters. For example, depending on an implementation, mobile device 202 may utilize, at least in part, more accurate expected RSTD and/or RSTD uncertainty values, as well as RSRP values, if appropriate, and/or a QoS parameter, such as a maximum response time for performing and/or replying with RSTD measurements to server 204, referenced generally at 218. A maximum response time may, for example, be specified via an integer number of seconds, as one example, such as measured between receipt of message 212 and an LPP Provide Location information message 220. As was indicated, here, one or more RSTD measurements may, for example, be performed by first measuring a TOA for a PRS acquired from a reference wireless transmitter and a TOA for a PRS acquired from a neighbor wireless transmitter and then determining an RSTD measurement from a difference in these two TOA measurements.

In an implementation, mobile device 202 may then transmit LPP Provide Location Information message 220 to server 204, such as prior to or at expiration of maximum response time 218, for example, conveying RSTD measurements performed at 216. LPP Provide Location Information message 220 may also include a time (or times) at which one or more RSTD measurements were obtained, for example, and an identity of a reference wireless transmitter for RSTD measurements (e.g. a reference Cell ID, carrier frequency, etc.). Message 220 may also include, for example, identities of measured neighbor wireless transmitters (e.g. a PCI, Global Cell ID, cell carrier frequency, etc.), quality of applicable measurements (e.g. an expected error in an RSTD measurement, etc.), etc. As further illustrated at 222, in an implementation, server 204 may, for example, compute a position fix of mobile device 202 based, at least in part, on transmitted RSTD measurements, such as via one or more appropriate positioning techniques (e.g., OTDOA, AFLT, etc.). In some instances, a position fix of mobile device 202 may, for example, be computed at or by mobile device 202, such as if assistance data provided via message 210 includes BSA for a reference and neighbor wireless transmitters (e.g., location coordinates, synchronization data, etc.). In such a case, mobile device 202 may, for example, provide its computed location estimate to server 204 via message 220.

In these one or more implementations, at times, a search for a PRS by mobile device 202 may, for example, be initiated prior to receiving or obtaining OTDOA assistance data via LPP Provide Assistance Data message 210. As was indicated, in some instances, this may, for example, facilitate and/or support relatively faster and/or more accurate TTFF of mobile device 202. For example, as discussed above, a cellular or like wireless service provider may know locations of its local wireless transmitters on a Wi-Fi or like WLAN network as well as locations of its reference and neighbor wireless transmitters on an LTE or like network. With knowledge of these locations, more accurate PRS search parameters, such as one or more expected RSTD and/or expected RSTD uncertainty values, for example, may be computed, such as using one or more approaches discussed above. Here, a cellular or like wireless service provider may, for example, broadcast one or more PRS search parameters via its one or more local wireless transmitters, such as periodically, according to a pre-defined schedule, etc. so as to be acquired by mobile device 202 and used, at least in part, to initiate a search for a PRS without waiting for (other) OTDOA assistance data. In some instances, mobile device 202 may also be capable of refining previously obtained (e.g., broadcasted, etc.) PRS search parameters, such as, for example, if later-communicated OTDOA assistance data comprises more accurate expected RSTD and/or expected RSTD uncertainty values, if applicable.

Also, at times, a cellular or like wireless service provider may, for example, utilize its one or more local wireless transmitters to broadcast one or more PRS transmission-related parameters of neighbor wireless transmitters, such as also determined in connection with a more accurate "a priori" location of mobile device 202, discussed above. Here, PRS transmission-related parameters may include, for example, a PRS configuration index $I_{PRS}$, PRS periodicity $T_{PRS}$, number of PRS subframes $N_{PRS}$, absolute radio frequency channel number (ARFCN), or the like. These or like parameters are generally known and need not be described here in greater detail. Likewise, these or like parameters may, for example, be broadcasted periodically, according to a pre-defined schedule, etc. and may be used, at least in part, by mobile device 202 to start searching for applicable PRS prior to receiving LPP Provide Assistance Data message 210. Thus, for these example implementations, based, at least in part, on one or more broadcasted PRS search parameters and/or PRS transmission-related parameters, timing of TTFF may be improved, among other things, as was indicated. For example, time delays attributable to a so-called "cold" start may be eliminated or reduced, such as via narrowing a search window by focusing on a specified range and/or area defined by these or like parameters. This may also allow mobile device 202 to search for PRS in a more effective and/or more efficient manner, which may prolong battery life of mobile device 202, improve its power consumption, or the like. It should be noted that, in some instances, these or like parameters may, for example, be broadcasted via local wireless transmitters to one or more particular mobile devices (e.g., authorized, subscribing, etc.) and/or via secure broadcasts (e.g., encrypted, etc.).

Further, in some instances, one or more Internet-of-Things (IoT) devices installed in a so-called "smart home" or like environment may also be used, at least in part, to facilitate and/or support initiation of PRS searches prior to receiving or obtaining OTDOA positioning assistance data from server 204, such as via LPP Provide Assistance Data message 210, for example. A "smart home" may typically refer to a local area equipped with network-interconnected devices, such as via LTE, Wi-Fi, Bluetooth®, or like protocols, for controlling, automating, optimizing, etc. one or more functions (e.g., temperature, lighting, security, safety, entertainment, communication, etc.) via a computing device, remotely or otherwise. As was indicated, these IoT devices may, for example, have a WLAN or like capability (e.g., built-in, etc.) in addition to an LTE or like capability, meaning that these devices may communicate with and/or via one or more Wi-Fi access points supported via and/or interconnected with LTE as a backbone network, as one example. As such, at times, these IoT devices may, for example, be conceptually thought of as and/or may be similar to local wireless transmitters, such as discussed above. Thus, here, similarly to one or more implementations discussed above, one or more IoT devices may communicate with a suitable location server, such as server 204, for example, and may obtain one or more PRS search parameters, PRS transmission-related parameters, etc., as well as determine its location, such as via one or more appropriate OTDOA message exchanges, as was also discussed. Likewise, one or more IoT devices may subsequently broadcast these or like parameters in a suitable manner to a proximate mobile device, such as mobile device 202, for example, which may use these or like parameters to optimize PRS searches in a similar fashion, such as via a smaller and/or more precise search window determined in connection with a location of a particular IoT device used as a proxy for a location of mobile device 202. Also, at times, a mobile device of interest, such as mobile device 202, for example, may make use of one or more applicable RTT values obtained from one or more IoT devices, if suitable or desired, so as to correct and/or refine one or more PRS search parameters (e.g., expected RSTD values, etc.) previously broadcasted in connection with one or more OTDOA message exchanges.

Figure 3:
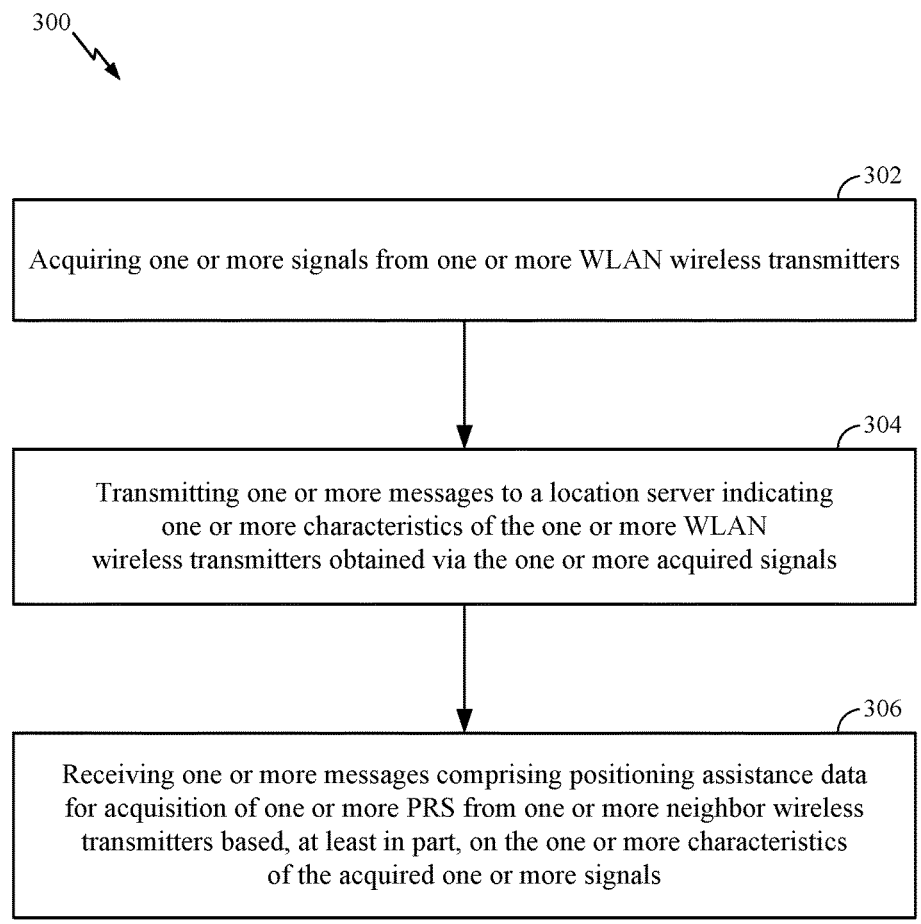
FIG. 3 is a flow diagram illustrating an implementation of an example process for improving OTDOA positioning via one or more local wireless transmitters.

With this in mind, attention is now drawn to FIG. 3, which is a flow diagram illustrating an implementation of an example process 300 that may be performed, in whole or in part, to facilitate and/or support one or more operations and/or techniques for improving OTDOA positioning via one or more local wireless transmitters for use in or with a location-aware mobile device, such as mobile device 102 of FIG. 1 and/or mobile device 202 of FIG. 2, for example. It should be noted that information acquired or produced, such as, for example, input signals, output signals, operations, results, etc. associated with example process 300 may be represented via one or more digital signals. It should also be appreciated that even though one or more operations are illustrated or described concurrently or with respect to a certain sequence, other sequences or concurrent operations may be employed. In addition, although the description below references particular aspects or features illustrated in certain other figures, one or more operations may be performed with other aspects or features.

Example process 300 may, for example, begin at operation 302 with acquiring one or more signals from one or more local wireless transmitters, which may include WLAN wireless transmitters, just to illustrate one possible implementation. As was indicated, to acquire one or more signals, in some instances, a mobile device may perform a scan, such as a passive and/or active scan, for example, while located within an area of interest, such as in an indoor area, outdoor area, or any combination thereof. Via a scan, a mobile device may, for example, detect and/or decode particular characteristics of one or more local wireless transmitters encoded in observed wireless signals using one or more appropriate techniques. At times, one or more characteristics of one or more local wireless transmitters may, for example, be obtained in connection with one or more positioning tiles, as was also discussed. Depending on an implementation, characteristics of local wireless transmitters may include, for example, a Cell ID, BSS ID, MAC address, received signal strength, round trip time, or the like. One or more local wireless transmitters may comprise, for example, a Wi-Fi access point, Bluetooth® beacon, radio beacon, femtocell, picocell, or the like, or any combination thereof.

With regard to operation 304, one or more messages indicating one or more characteristics of the one or more local wireless transmitters (e.g., a Cell ID, MAC address, BSS ID, etc.), such as one or more WLAN wireless transmitters, for example, obtained via the one or more acquired signals may be transmitted to a location server. In some instances, one or more characteristics of one or more local wireless transmitters may, for example, be transmitted via an LPP Provide Capabilities message (e.g., message 208 of FIG. 2, etc.), though claimed subject matter is not so limited. For example, at times, one or more characteristics of one or more local wireless transmitters may be transmitted via an LPP Request Assistance Data message, just to illustrate another possible implementation. As was also discussed, based, at least in part, on one or more transmitted characteristics, a location server (e.g., server 204 of FIG. 2, etc.) may, for example, be capable of correlating an identity of a particular local wireless transmitter with its location, such as via a mapped Cell ID stored in an appropriate database (e.g., maintained by a wireless service provider, etc.). Thus, having received one or more characteristics of one or more local wireless transmitters, a location server may, for example, determine their respective locations and may compute more accurate expected RSTD and/or expected RSTD uncertainty values, such as in connection with one or more approaches discussed herein. At times, locations of one or more local wireless transmitters may be determined via one or more crowdsourcing operations, for example. In some instances, a location of a particular local wireless transmitter may, for example, be considered as a rough or "a priori" location of a proximate mobile device, such as using one or more appropriate techniques, and may be used, at least in part, to compute more accurate PRS search parameters.

At operation 306, one or more messages comprising positioning assistance data for acquisition of one or more PRS from one or more neighbor wireless transmitters based, at least in part, on the one or more characteristics of the acquired one or more signals may, for example, be received (e.g., from a location server, etc.). In some instances, positioning assistance data may, for example, be received via an LPP Provide Assistance Data message (e.g., message 210 of FIG. 2, etc.), just to illustrate one possible implementation, and may include applicable PRS search parameters, such as expected RSTD and/or expected RSTD uncertainty values, or the like. A mobile device may, for example, utilize, in whole or in part, obtained positioning assistance data to perform one or more RSTD measurements, such as based, at least in part, on more accurate "a priori" estimation of a mobile device's location determined via the one or more local wireless transmitters. For example, depending on an implementation, a mobile device may utilize, at least in part, more accurate expected RSTD and/or RSTD uncertainty values, as well as RSRP values, if appropriate, such as to perform and/or reply with RSTD measurements, as requested by a location server.

As was also discussed, at times, acquisition of one or more PRS from one or more neighbor wireless transmitters by a mobile device may, for example, be initiated prior to receiving the one or more messages comprising positioning assistance data. In some instances, this may, for example, be implemented in connection with broadcasting one or more appropriate parameters for searching a PRS using the one or more local wireless transmitters, at least in part. At times, this may, for example, facilitate and/or support relatively faster and/or more accurate TTFF of a mobile device. In some instances, this may also improve OTDOA or like positioning, as also discussed herein. Likewise, here, having acquired appropriate PRS, a mobile device may, for example, perform one or more applicable measurements (e.g., RSTD measurements, etc.) in a more effective and/or more efficient manner and may communicate these measurements to a location server via a suitable message (e.g., message 220 of FIG. 2, etc.), such as for computation of a position fix.

Figure 4:
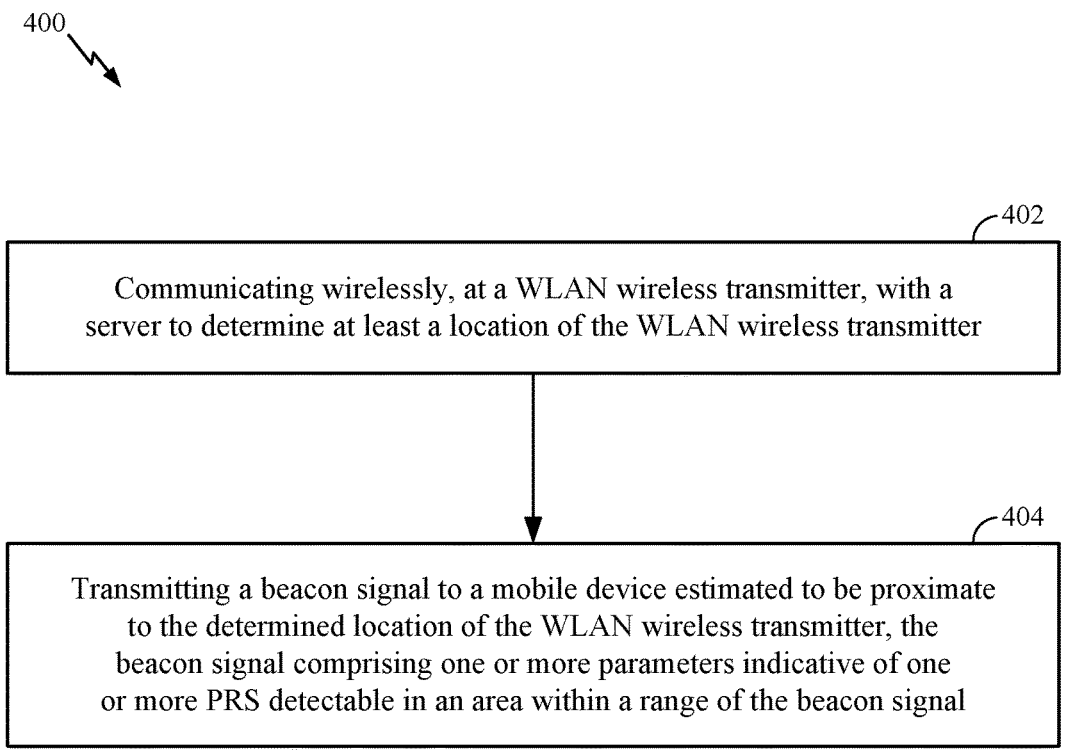
FIG. 4 is a flow diagram illustrating another implementation of an example process for improving OTDOA positioning via one or more local wireless transmitters.

FIG. 4 is a flow diagram illustrating an implementation of another example process, referenced herein at 400, that may be performed, in whole or in part, to facilitate and/or support one or more operations and/or techniques for improving OTDOA positioning via one or more local wireless transmitters for use in or with a location-aware mobile device, such as mobile device 102 of FIG. 1 and/or mobile device 202 of FIG. 2, for example. Likewise, it should be noted that information acquired or produced, such as, for example, input signals, output signals, operations, results, etc. associated with example process 400 may be represented via one or more digital signals. It should also be appreciated that even though one or more operations are illustrated or described concurrently or with respect to a certain sequence, other sequences or concurrent operations may be employed. In addition, although the description below references particular aspects or features illustrated in certain other figures, one or more operations may be performed with other aspects or features.

Example process 400 may begin at operation 402 with communicating wirelessly, such as at a local wireless transmitter, which may include a WLAN wireless transmitter, for example, with a server to determine at least a location of the local wireless transmitter (e.g., a WLAN transmitter, etc.). For example, a local wireless transmitter may communicate wirelessly for purposes of periodically performing one or more OTDOA message exchanges, such as in connection with one or more OTDOA positioning sessions to obtain one or more appropriate parameters, such as a PRS configuration index $I_{PRS}$, PRS periodicity $T_{PRS}$, number of PRS subframes $N_{PRS}$, absolute radio frequency channel number (ARFCN), expected RSTD and/or expected RSTD uncertainty values, or the like. Based, at least in part, on these or like parameters, a local wireless transmitter may, for example, be capable of determining its "a priori" location, such as using one or more appropriate techniques. As was indicated, in at least one implementation, a local wireless transmitter may comprise, for example, an IoT device installed in a smart home or like environment.

With regard to operation 404, a beacon signal may, for example, be transmitted to a mobile device estimated to be proximate to the determined location of the local wireless transmitter (e.g., a WLAN wireless transmitter, etc.), the beacon signal comprising one or more parameters indicative of one or more positioning reference signals (PRS) detectable in an area within a range of the beacon signal. Likewise, here, a mobile device may, for example, be estimated to be proximate to the determined location of a local wireless transmitter via one or more approaches discussed herein. Thus, one or more parameters indicative of one or more PRS detectable in an area within a range of the beacon signal, such as determined in connection with one or more OTDOA positioning sessions, as discussed above, may, for example, be broadcasted in one or more beacon signals, so that one or more mobile devices within a range of these beacon signals may make use of these one or more parameters and fine tune a search for acquiring PRS and/or performing one or more RSTD measurements. In some instances, a beacon signal may, for example, be transmitted to one or more particular mobile devices (e.g., authorized, subscribing, etc.) and/or via secure broadcasts (e.g., encrypted, etc.), as was also discussed. Similarly, here, having performed one or more applicable RSTD measurements, a mobile device may, for example, communicate the measurements to a location server via any suitable message (e.g., message 220 of FIG. 2, etc.), such as for computation of a position fix. Again, these one or more approaches may, for example, improve OTDOA positioning performance, shorten TTFF, or the like.

Figure 5:
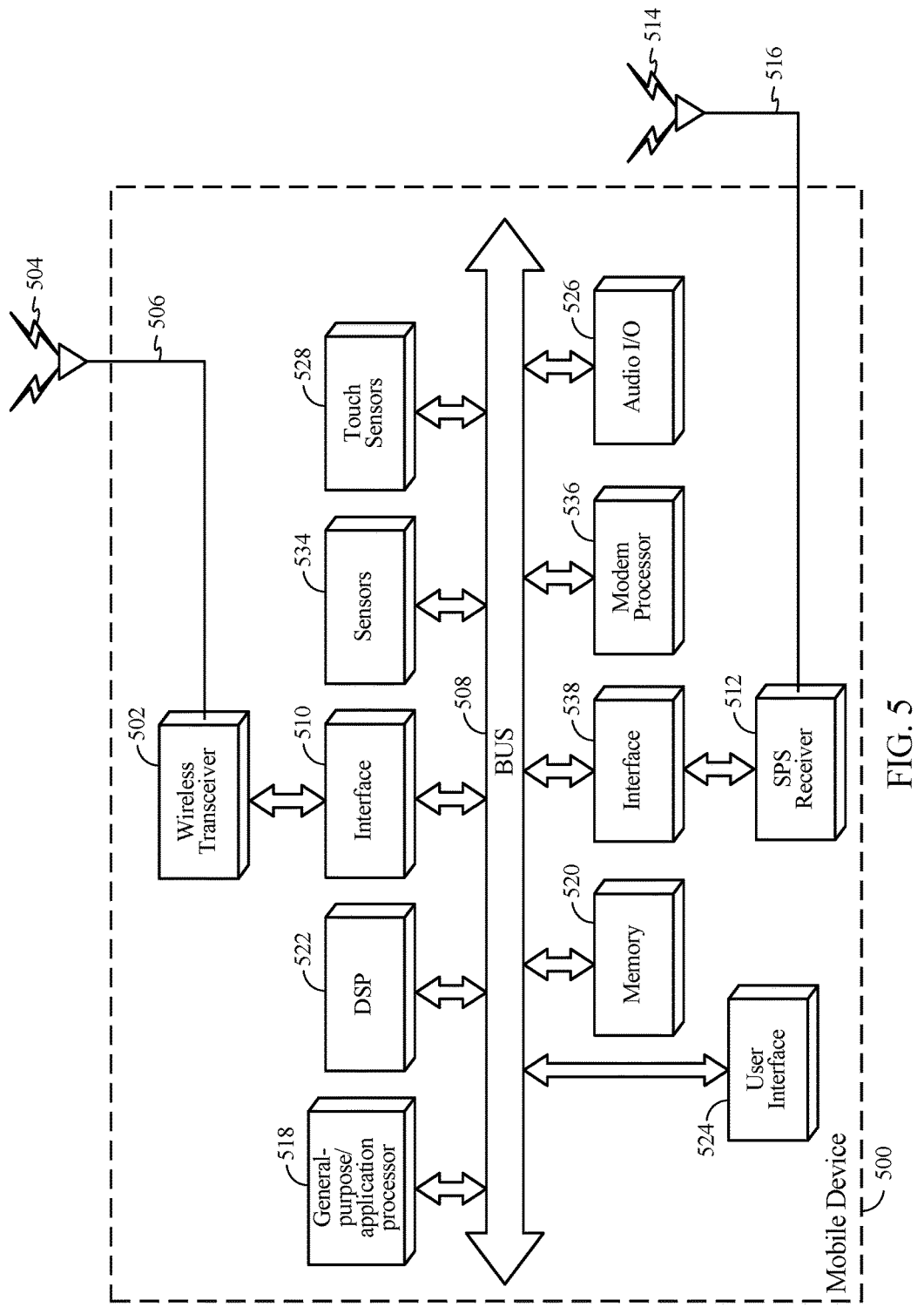
FIG. 5 is a schematic diagram illustrating an implementation of an example computing environment associated with a mobile device.

FIG. 5 is a schematic diagram of an implementation of an example computing environment associated with a mobile device that may be used, at least in part, to facilitate and/or support one or more operations and/or techniques for improving OTDOA positioning via one or more local wireless transmitters. An example computing environment may comprise, for example, a mobile device 500 that may include one or more features or aspects of mobile device 102 of FIG. 1 and/or mobile device 202 of FIG. 2, though claimed subject matter is not so limited. For example, in some instances, mobile device 500 may comprise a wireless transceiver 502 capable of transmitting and/or receiving wireless signals, referenced generally at 504, such as via an antenna 506 over a suitable wireless communications network. Wireless transceiver 502 may, for example, be capable of sending or receiving one or more suitable communications, such as one or more communications discussed with reference to FIGS. 1-4. Wireless transceiver 502 may, for example, be coupled or connected to a bus 508 via a wireless transceiver bus interface 510. Depending on an implementation, at times, wireless transceiver bus interface 510 may, for example, be at least partially integrated with wireless transceiver 502. Some implementations may include multiple wireless transceivers 502 or antennas 506 so as to enable transmitting or receiving signals according to a corresponding multiple wireless communication standards such as WLAN or WiFi, Code Division Multiple Access (CDMA), Wideband-CDMA (W-CDMA), Long Term Evolution (LTE), Bluetooth®, just to name a few examples.

In an implementation, mobile device 500 may, for example, comprise an SPS or like receiver 512 capable of receiving or acquiring one or more SPS or other suitable wireless signals 514, such as via an SPS or like antenna 516. SPS receiver 512 may process, in whole or in part, one or more acquired SPS signals 514 for estimating a location of mobile device 500, rough or otherwise. In some instances, one or more general-purpose/application processors 518 (henceforth referred to as "processor"), memory 520, digital signal processor(s) (DSP) 522, or like specialized devices or processors not shown may be utilized to process acquired SPS signals 514, in whole or in part, calculate a location of mobile device 500, such as in conjunction with SPS receiver 512, or the like. Storage of SPS or other signals for implementing one or more positioning operations, such as in connection with one or more operations and/or techniques for improving OTDOA positioning via one or more local wireless transmitters, for example, may be performed, at least in part, in memory 520, suitable registers and/or buffers (not shown). Although not shown, it should be appreciated that in at least one implementation one or more processors 518, memory 520, DSPs 522, or like specialized devices or processors may comprise one or more processing modules capable of acquiring one or more signals from one or more local wireless transmitters; transmitting one or more messages to a location server indicating one or more characteristics of the one or more local wireless transmitters obtained via the one or more acquired signals; and receiving one or more messages comprising positioning assistance data for acquisition of one or more positioning reference signals (PRS) from one or more neighbor wireless transmitters based, at least in part, on the one or more characteristics of the acquired one or more signals.

It should be noted that all or part of one or more processing modules may be implemented using or otherwise including hardware, firmware, software, or any combination thereof. Processing modules may be representative of one or more circuits capable of performing at least a portion of information computing technique or process. By way of example but not limitation, processor 518 or DSP 522 may include one or more processors, controllers, microprocessors, microcontrollers, application specific integrated circuits, digital signal processors, programmable logic devices, field programmable gate arrays, central processing units, graphics processor units, or the like, or any combination thereof. Thus, at times, processor 518 or DSP 522 or any combination thereof may comprise or be representative of means for acquiring one or more signals from one or more local wireless transmitters, such as to implement operation 302 of FIG. 3, at least in part. In addition, in at least one implementation, processor 518 or DSP 522 may be representative of or comprise, for example, means for transmitting one or more messages to a location server indicating one or more characteristics of the one or more local wireless transmitters obtained via the one or more acquired signals, such as to implement operation 304 of FIG. 3, at least in part. Also, in some instances, processor 518 or DSP 522 may be representative of or comprise, for example, means for receiving one or more messages comprising positioning assistance data for acquisition of one or more positioning reference signals (PRS) from one or more neighbor wireless transmitters based, at least in part, on the one or more characteristics of the acquired one or more signals, such as to implement operation 306 of FIG. 3, at least in part.

As illustrated, DSP 522 may be coupled or connected to processor 518 and memory 520 via bus 508. Although not shown, in some instances, bus 508 may comprise one or more bus interfaces that may be integrated with one or more applicable components of mobile device 500, such as DSP 522, processor 518, memory 520, or the like. In various embodiments, one or more operations or functions described herein may be performed in response to execution of one or more machine-readable instructions stored in memory 520, such as on a computer-readable storage medium, such as RAM, ROM, FLASH, disc drive, etc., just to name a few examples. Instructions may, for example, be executable via processor 518, one or more specialized processors not shown, DSP 522, or the like. Memory 520 may comprise a non-transitory processor-readable memory, computer-readable memory, etc. that may store software code (e.g., programming code, instructions, etc.) that may be executable by processor 518, DSP 522, or the like to perform operations or functions described herein.

Mobile device 500 may comprise a user interface 524, which may include any one of several devices such as, for example, a speaker, microphone, display device, vibration device, keyboard, touch screen, etc., just to name a few examples. In at least one implementation, user interface 524 may enable a user to interact with one or more applications hosted on mobile device 500. For example, one or more devices of user interface 524 may store analog or digital signals on memory 520 to be further processed by DSP 522, processor 518, etc. in response to input or action from a user. Similarly, one or more applications hosted on mobile device 500 may store analog or digital signals in memory 520 to present an output signal to a user. In some implementations, mobile device 500 may optionally include a dedicated audio input/output (I/O) device 526 comprising, for example, a dedicated speaker, microphone, digital to analog circuitry, analog to digital circuitry, amplifiers, gain control, or the like. It should be understood, however, that this is merely an example of how audio I/O device 526 may be implemented, and that claimed subject matter is not limited in this respect. As seen, mobile device 500 may comprise one or more touch sensors 528 responsive to touching or like pressure applied on a keyboard, touch screen, or the like.

Mobile device 500 may comprise one or more sensors 534 coupled or connected to bus 508, such as, for example, one or more inertial sensors, ambient environment sensors, or the like. Inertial sensors of sensors 544 may comprise, for example, one or more accelerometers (e.g., collectively responding to acceleration of mobile device 500 in one, two, or three dimensions, etc.), gyroscopes or magnetometers (e.g., to support one or more compass or like applications, etc.), etc., just to illustrate a few examples. Ambient environment sensors of mobile device 500 may comprise, for example, one or more barometric pressure sensors, temperature sensors, ambient light detectors, camera sensors, microphones, etc., just to name few examples. Sensors 534 may generate analog or digital signals that may be stored in memory 520 and may be processed by DSP 522, processor 518, etc., such as in support of one or more applications directed to positioning or navigation operations, wireless communications, radio heat map learning, video gaming or the like.

In a particular implementation, mobile device 500 may comprise, for example, a modem processor 536, dedicated or otherwise, capable of performing baseband processing of signals received or downconverted via wireless transceiver 502, SPS receiver 512, or the like. Similarly, modem processor 536 may perform baseband processing of signals to be upconverted for transmission via wireless transceiver 502, for example. In alternative implementations, instead of having a dedicated modem processor, baseband processing may be performed, at least in part, by processor 518, DSP 522, or the like. In addition, in some instances, an interface 538, although illustrated as a separate component, may be integrated, in whole or in part, with one or more applicable components of mobile device 500, such as bus 508 or SPS receiver 512, for example. Optionally or alternatively, SPS receiver 512 may be coupled or connected to bus 508 directly. It should be understood, however, that these are merely examples of components or structures that may perform baseband processing, and that claimed subject matter is not limited in this regard.

Figure 6:
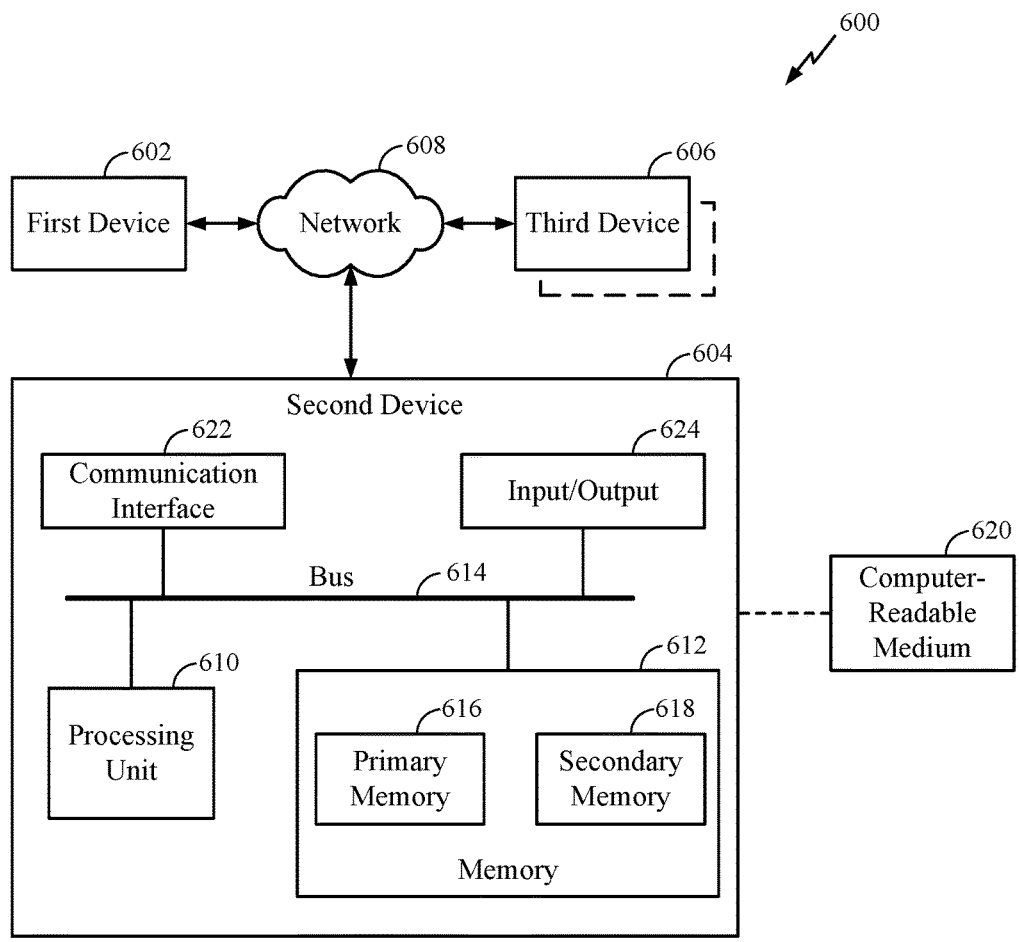
FIG. 6 is a schematic diagram illustrating an implementation of an example computing environment associated with a server.

FIG. 6 is a schematic diagram illustrating an implementation of an example computing environment or system 600 that may be associated with and/or include one or more servers and/or other devices capable of partially and/or substantially implementing and/or supporting one or more operations and/or techniques for improving OTDOA positioning via one or more local wireless transmitters, such as discussed above in connection with FIGS. 1-5, for example. Computing environment 600 may include, for example, a first device 602, a second device 604, a third device 606, etc., which may be operatively coupled together via a communications network 608. In some instances, first device 602 may comprise a location server capable of providing positioning assistance parameters, such as, for example, identities, locations, etc. of known wireless transmitters, radio heat map, base station almanac, electronic digital map, database of wireless transmitters, bias estimates, signal measurements, reference transmitter parameters, neighbor transmitter parameters, positioning tiles, GDOP priority lists, or the like, such as discussed herein. For example, first device 602 may also comprise a server capable of providing an electronic digital map to a mobile device based, at least in part, on a priori or rough estimate of a location of the mobile device (e.g., determined via last known SPS position fix, dead reckoning using one or more appropriate sensors, Cell ID, enhanced Cell ID, positioning tiles, etc.), upon request, or the like. First device 602 may also comprise a server capable of providing any other suitable positioning assistance data (e.g., a radio heat map, positioning tiles, etc.) relevant to a location of a mobile device. Second device 604 or third device 606 may comprise, for example, mobile devices, though claimed subject matter is not so limited. For example, in some instances, second device 604 may comprise a server functionally or structurally similar to first device 602, just to illustrate another possible implementation. In addition, communications network 608 may comprise, for example, one or more wireless transmitters, such as cellular base stations, Wi-Fi access points, femtocells, or the like. Of course, claimed subject matter is not limited in scope in these respects.

First device 602, second device 604, or third device 606 may be representative of any device, appliance, platform, or machine that may be capable of exchanging parameters and/or information over communications network 608. By way of example but not limitation, any of first device 602, second device 604, or third device 606 may include: one or more computing devices or platforms, such as, for example, a desktop computer, a laptop computer, a workstation, a server device, or the like; one or more personal computing or communication devices or appliances, such as, for example, a personal digital assistant, mobile communication device, or the like; a computing system or associated service provider capability, such as, for example, a database or information storage service provider/system, a network service provider/system, an Internet or intranet service provider/system, a portal or search engine service provider/system, a wireless communication service provider/system; or any combination thereof. Any of first, second, or third devices 602, 604, and 606, respectively, may comprise one or more of a mobile device, wireless transmitter or receiver, server, etc. in accordance with example implementations described herein.

In an implementation, communications network 608 may be representative of one or more communication links, processes, or resources capable of supporting an exchange of information between at least two of first device 602, second device 604, or third device 606. By way of example but not limitation, communications network 608 may include wireless or wired communication links, telephone or telecommunications systems, information buses or channels, optical fibers, terrestrial or space vehicle resources, local area networks, wide area networks, intranets, the Internet, routers or switches, and the like, or any combination thereof. As illustrated, for example, via a dashed lined box partially obscured by third device 606, there may be additional like devices operatively coupled to communications network 608. It is also recognized that all or part of various devices or networks shown in computing environment 600, or processes or methods, as described herein, may be implemented using or otherwise including hardware, firmware, software, or any combination thereof.

By way of example but not limitation, second device 604 may include at least one processing unit 610 that may be operatively coupled to a memory 612 via a bus 614. Processing unit 610 may be representative of one or more circuits capable of performing at least a portion of a suitable computing procedure or process. For example, processing unit 610 may include one or more processors, controllers, microprocessors, microcontrollers, application specific integrated circuits, digital signal processors, programmable logic devices, field programmable gate arrays, or the like, or any combination thereof. Although not shown, second device 604 may include a location-tracking unit that may initiate a position fix of a suitable mobile device, such as in an area of interest, for example, based, at least in part, on one or more received or acquired wireless signals, such as from an SPS, one or more cellular base stations, Wi-Fi access points, etc. In some implementations, a location-tracking unit may be at least partially integrated with a suitable processing unit, such as processing unit 610, for example, though claimed subject matter is not so limited. In certain server-based or server-supported implementations, processing unit 610 may, for example, comprise means for communicating wirelessly, such as via an applicable bus and/or communication interface, as discussed herein, with a server to determine at least a location of a local wireless transmitter, such as to facilitate and/or support operations 402 and/or 404 of FIG. 4, at least in part. In some instances, processing unit 610 may, for example, comprise means for transmitting, such as via an applicable bus and/or communication interface, as discussed herein, a beacon signal to a mobile device estimated to be proximate to the determined location of the local wireless transmitter, the beacon signal comprising one or more parameters indicative of one or more positioning reference signals (PRS) detectable in an area within a range of the beacon signal, such as to facilitate and/or support operations 402 and/or 404 of FIG. 4, at least in part.

Memory 612 may be representative of any information storage mechanism or appliance. Memory 612 may include, for example, a primary memory 616 and a secondary memory 618. Primary memory 616 may include, for example, a random access memory, read only memory, etc. While illustrated in this example as being separate from processing unit 610, it should be understood that all or part of primary memory 616 may be provided within or otherwise co-located/coupled with processing unit 610. Secondary memory 618 may include, for example, same or similar type of memory as primary memory or one or more information storage devices or systems, such as, for example, a disk drive, an optical disc drive, a tape drive, a solid state memory drive, etc. In certain implementations, secondary memory 618 may be operatively receptive of, or otherwise configurable to couple to, a computer-readable medium 620. Computer-readable medium 620 may include, for example, any non-transitory storage medium that may carry or make accessible information, code, or instructions for one or more of devices in computing environment 600. Computer-readable medium 620 may also be referred to as a machine-readable medium, storage medium, or the like.

Second device 604 may include, for example, a communication interface 622 that may provide for or otherwise support an operative coupling of second device 604 to at least communications network 608. By way of example but not limitation, communication interface 622 may include a network interface device or card, a modem, a router, a switch, a transceiver, and the like. Second device 604 may also include, for example, an input/output device 624. Input/output device 624 may be representative of one or more devices or features that may be configurable to accept or otherwise introduce human or machine inputs, or one or more devices or features that may be capable of delivering or otherwise providing for human or machine outputs. By way of example but not limitation, input/output device 624 may include an operatively configured display, speaker, keyboard, mouse, trackball, touch screen, information port, or the like.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units de-signed to perform the functions described herein, or combinations thereof.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, measurements, messages, parameters, frames, packets, content and/or the like. It should be understood, however, that all of these and/or similar terms are to be associated with appropriate physical quantities or manifestations, and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. Likewise, operation of a memory device to store bits, values, elements, symbols, characters, terms, numbers, numerals, measurements, messages, parameters, frames, packets, content and/or the like may comprise a physical transformation. With particular types of memory devices, such a physical transformation may comprise a physical transformation of an article to a different state or thing. For example, but without limitation, for some types of memory devices, a change in state may involve an accumulation and/or storage of charge or a re-lease of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") net-work, a Single-Carrier Frequency Division Multiple Access ("SC-FDMA") net-work, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project"

("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more examples; however, again, particular context of description and/or usage provides helpful guidance regarding inferences to be drawn.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. Signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example.

In general, of course, these and other issues vary with context. Therefore, particular context of description and/or usage provides helpful guidance regarding inferences to be drawn.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method, at a mobile device, the method comprising:
   acquiring one or more signals from one or more local wireless transmitters;
   transmitting, via the mobile device, one or more messages to a location server indicating one or more characteristics of the one or more local wireless transmitters obtained via the one or more acquired signals; and
   receiving one or more messages comprising positioning assistance data for acquisition of one or more positioning reference signals (PRS) from one or more neighbor wireless transmitters for use in performing one or more reference signal time difference (RSTD) measurements based, at least in part, on the one or more characteristics of the one or more local wireless transmitters transmitted to the location server via the mobile device.

2. The method of claim 1, and further comprising obtaining one or more parameters for searching for at least one of the one or more PRS based, at least in part, on the positioning assistance data.

3. The method of claim 1, and further comprising obtaining one or more parameters for searching for at least one of the one or more PRS prior to receiving the one or more messages comprising the positioning assistance data.

4. The method of claim 3, wherein the one or more parameters are broadcasted via at least one of the one or more local wireless transmitters.

5. The method of claim 3, wherein the one or more parameters comprise one or more of: a PRS configuration index $I_{PRS}$; PRS periodicity $T_{PRS}$; a number of PRS subframes $N_{PRS}$; an absolute radio frequency channel number (ARFCN); an expected RSTD value; or expected RSTD uncertainty value; or any combination thereof.

6. The method of claim 3, wherein the one or more parameters are obtained so as to shorten a time-to-first fix (TTFF) of the mobile device.

7. The method of claim 1, wherein the positioning assistance data is based, at least in part, on a mapping of stored locations of the one or more local wireless transmitters to the one or more characteristics of the one or more local wireless transmitters.

8. The method of claim 7, wherein the mapping is maintained by a wireless service provider.

9. The method of claim 7, wherein the stored locations of the one or more local wireless transmitters are obtained via one or more crowdsourcing operations.

10. The method of claim 1, wherein the one or more characteristics of the one or more local wireless transmitters are obtained via one or more positioning tiles.

11. The method of claim 1, wherein the positioning assistance data comprises one or more predicted reference signal time difference (RSTD) values computed based, at least in part, on an estimate of a location of the mobile device.

12. The method of claim 11, wherein the one or more predicted RSTD values comprise: an expected RSTD value; or expected RSTD uncertainty value; or a combination thereof.

13. The method of claim 11, wherein the estimate of the location of the mobile device comprises a rough or "a priori" location of the mobile device determined based, at least in part, on the one or more characteristics of the one or more local wireless transmitters.

14. The method of claim 1, wherein the one or more local wireless transmitters and the neighbor wireless transmitters are associated with a wireless service provider.

15. The method of claim 1, wherein the one or more characteristics identify the one or more local wireless transmitters.

16. The method of claim 1, and further comprising obtaining one or more parameters for searching for at least one of the one or more PRS based, at least in part, on measured power levels of the one or more local wireless transmitters.

17. The method of claim 16, wherein the measured power levels comprise signal strength levels represented via received signal strength indicator (RSSI) values.

18. The method of claim 1, wherein the positioning assistance data is received according to: a Long Term Evolution (LTE) positioning protocol (LPP); an LPP extensions (LPPe) protocol; or a Secure User Plane Location (SUPL) user plane location protocol (ULP).

19. The method of claim 1, wherein the one or more PRS comprise one or more of: PRS in Long Term Evolution (LTE); 1× signals for in Code Division Multiple Access (CDMA); satellite positioning system (SPS) signals; wireless wide area network (WWAN) signals; a downlink reference signal; a pilot signal, or any combination thereof.

20. The method of claim 1, wherein the location server comprises an Enhanced Serving Mobile Location Center (E-SMLC) or a Secure User Plane Location (SUPL) Location Platform (SLP) or emergency SLP (eSLP).

21. An apparatus comprising:
   a communication interface to communicate with an electronic communications network, the communication interface configured to:
     acquire one or more signals from one or more local wireless transmitters; and
   one or more processors coupled to a memory and to the communication interface, the one or more processors configured to:
     transmit, via a mobile device, one or more messages to a location server indicating one or more characteristics of the one or more local wireless transmitters obtained via the one or more acquired signals; and
     receive one or more messages comprising positioning assistance data for acquisition of one or more positioning reference signals (PRS) from one or more neighbor wireless transmitters for use in performing one or more reference signal time difference (RSTD) measurements based, at least in part, on the one or more characteristics of the one or more local wireless transmitters transmitted to the location server via the mobile device.

22. The apparatus of claim 21, wherein the positioning assistance data comprises one or more predicted reference signal time difference (RSTD) values computed based, at least in part, on an estimate of a location of the mobile device.

23. The apparatus of claim 22, wherein the estimate of the location of the mobile device comprises a rough or "a priori" location of the mobile device determined based, at least in part, on the one or more characteristics of the one or more local wireless transmitters.

24. The apparatus of claim 21, wherein the positioning assistance data comprises one or more predicted reference signal time difference (RSTD) values computed based, at least in part, on a rough or "a priori" location of the mobile device determined based, at least in part, on the one or more characteristics of the one or more local wireless transmitters.

25. A non-transitory storage medium having instructions executable by a processor to:
  acquire one or more signals from one or more local wireless transmitters;
  initiate, via a mobile device, a transmission of one or more messages to a location server indicating one or more characteristics of the one or more local wireless transmitters obtained via the one or more acquired signals; and
  process a receipt of one or more messages comprising positioning assistance data for acquisition of one or more positioning reference signals (PRS) from one or more neighbor wireless transmitters for use in performing one or more reference signal time difference (RSTD) measurements based, at least in part, on the one or more characteristics of the one or more local wireless transmitters transmitted to the location server via the mobile device.

26. A method, at a local wireless transmitter, the method comprising: communicating wirelessly with a server to determine at least a location of the local wireless transmitter; communicating wirelessly with a mobile device to determine whether the mobile device is proximate to the determined location of the local wireless transmitter; and transmitting a beacon signal to the mobile device determined to be proximate to the local wireless transmitter via one or more characteristics of the local wireless transmitter transmitted to the server via the mobile device, the beacon signal comprising positioning assistance data having one or more parameters indicative of one or more positioning reference signals (PRS) detectable from one or more neighbor wireless transmitters for use in performing one or more reference signal time difference (RSTD) measurements in an area within a range of the beacon signal.

27. The method of claim 26, and further comprising selectively authorizing the mobile device to access the one or more parameters in the beacon signal.

28. The method of claim 26, wherein the one or more parameters comprise one or more of: a PRS configuration index $I_{PRS}$; PRS periodicity $T_{PRS}$; a number of PRS sub-frames $N_{PRS}$; an absolute radio frequency channel number (ARFCN); an expected RSTD value; or expected RSTD uncertainty value; or any combination thereof.

29. The method of claim 26, wherein the beacon signal further comprises one or more predicted RSTD values.

30. The method of claim 26, wherein the mobile device is determined to be proximate to the local wireless transmitter via a rough or "a priori" location of the mobile device determined based, at least in part, on a known location of the local wireless transmitter.

* * * * *